United States Patent
Kelly et al.

(10) Patent No.: US 6,817,218 B1
(45) Date of Patent: Nov. 16, 2004

(54) NON-LINEAR STATISTICALLY CONSTRAINED AVO INVERSION

(75) Inventors: Michael C. Kelly, Dayton, MT (US); Charles M. Skidmore, Tulsa, OK (US); David Ford, Tulsa, OK (US); Ray Cotton, Tulsa, OK (US)

(73) Assignee: Emerald Geoscience Research Corp., Houston, TX (US)

( * ) Notice: Subject to any disclaimer, the term of this patent is extended or adjusted under 35 U.S.C. 154(b) by 0 days.

(21) Appl. No.: 10/242,876

(22) Filed: Sep. 13, 2002

Related U.S. Application Data

(60) Provisional application No. 60/322,315, filed on Sep. 14, 2001.

(51) Int. Cl.[7] .................................................. G01V 1/28
(52) U.S. Cl. ............................................. 72/14; 702/18
(58) Field of Search ........................ 702/14, 18; 367/36

(56) References Cited

U.S. PATENT DOCUMENTS

| | | | |
|---|---|---|---|
| 5,838,634 A | * 11/1998 | Jones et al. | 367/73 |
| 5,999,486 A | * 12/1999 | DeVault | 367/36 |
| 6,058,074 A | * 5/2000 | Swan et al. | 367/38 |
| 6,091,669 A | * 7/2000 | Chen | 367/37 |
| 6,263,284 B1 | * 7/2001 | Crider et al. | 702/14 |
| 6,421,611 B1 | * 7/2002 | Kelly et al. | 702/18 |
| 6,618,678 B1 | * 9/2003 | Van Riel | 702/14 |
| 2002/0013661 A1 | * 1/2002 | Van Riel et al. | 702/2 |
| 2003/0018435 A1 | * 1/2003 | Jenner et al. | 702/14 |

OTHER PUBLICATIONS

Xiang–Yang Li, Hengchang Dai, Michael C. Mueller and Olav I. Barkved in "Compensating for the effects of gas clouds on C–wave imaging: A case study from Valhall" published in *the Leading Edge*, Sep. 2001, pp. 1022–1028.

Folke Engelmark, in "Using converted shear waves to image reservoirs with low–impedance contrast" published *The Leading Edge*, Jun. 2000, pp. 600–603.

* cited by examiner

*Primary Examiner*—Marc S. Hoff
*Assistant Examiner*—Anthony Gutierrez
(74) *Attorney, Agent, or Firm*—Osha & May L.L.P.

(57) ABSTRACT

A method is provided for ensuring increased accuracy and stability in analysis of seismic trace data. The present method more accurately determines the location, as well as the saturation level, of possible hydrocarbon reservoirs. The method includes use of more accurate, non-linear equations for the AVO inversion and application of a geologically reasonable set of statistical constraints.

21 Claims, 25 Drawing Sheets

(21 of 25 Drawing Sheet(s) Filed in Color)

Soft Constraints

$$\rho_{ave} = a * V p_{ave}^b$$

$$V s_{ave} = C1 * V p_{ave} + C2$$

200 — Non-linearly Statistically Constrained Inversion  210

Provide a geologically reasonable statistical constraint for the geological formation of interest, such that such constraint relates the values of two rock properties to each other, the two rock properties selected form the group consisting of density (ρ), pulse wave velocity (Vp) and shear-wave velocity (Vs).

220

Invert the rock property contrasts for each of a plurality of interfaces in the geological formation of interest using a non-linear equation to perform the inversion.

240

Use a non-linear equation of the form of Equation 10 as follows:

$$Amp(\Theta) = D00 + + D11 \cdot \sin(\Theta)^2 + D12 \cdot \tan(\Theta)^2 \sin(\Theta)^2 + D20 \cdot \tan(\Theta)^4$$
$$+ D21 \cdot f \sin(\Theta)^2 \cos(\Theta) + D22 \cdot \frac{\sin(\Theta)^2}{f \cos(\Theta)} + D23 \cdot \frac{\sin(\Theta)^4}{f \cos(\Theta)} + D24 \cdot \frac{\sin(\Theta)^6}{f \cos(\Theta)}$$

where:

$$D00 = \frac{1}{2}\left[\frac{\Delta V_p}{V_p}\right] + \frac{1}{2}\left[\frac{\Delta \rho}{\rho}\right] - \frac{1}{4}\left[\frac{\Delta V_p}{V_p}\right]^2 - \frac{1}{4}\left[\frac{\Delta \rho}{\rho}\right]^2 + \ldots$$

$$D11 = \frac{1}{2}\left[\frac{\Delta V_p}{V_p}\right] - \frac{2}{g^2}\left\{2\left[\frac{\Delta V_s}{V_s}\right] + \frac{\Delta \rho}{\rho}\right\} - \frac{2}{g^2}\left\{\left[\frac{\Delta V_s}{V_s}\right]\left[\frac{\Delta \rho}{\rho}\right] - \frac{1}{2}\left[\frac{\Delta \rho}{\rho}\right]^2 + \left[\frac{\Delta V_s}{V_s}\right]^2\right\} + \frac{1}{4}\left[\frac{\Delta V_p}{V_p}\right]$$

$$D12 = \frac{1}{2}\left[\frac{\Delta V_p}{V_p}\right] + \frac{1}{4}\left[\frac{\Delta V_p}{V_p}\right]^2$$

$$D21 = \frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}$$

$$D20 = \frac{1}{2}\left[\frac{\Delta V_p}{V_p}\right]^2$$

$$D22 = -\frac{1}{4}\left[\frac{\Delta \rho}{\rho}\right]^2$$

$$D23 = \frac{1}{g^2}\left\{2\left[\frac{\Delta V_s}{V_s}\right]\left[\frac{\Delta \rho}{\rho}\right] + \left[\frac{\Delta \rho}{\rho}\right]^2\right\}$$

$$D24 = -\frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}, \text{ and}$$

$$f = \sqrt{(g^2 - \sin(\Theta)^2)}.$$

Non-linearly Statistically Constrained Inversion

300

310 — Select constraints relationships between the elastic parameters Vp, Vs and/or ρ.

Examples:
$\rho = \alpha V_p^\beta$ ( Eq. 11 )   $V_s = C_2 + C_1 * V_p$ ( Eq. 12 )

320 — Determine the contrast form of the constraint relationships.

Examples:
$\Delta\rho/\rho = \beta*(\Delta V_p/V_p)$ ( Eq. 13 )   $\Delta V_s/V_s = 1/(1+(C_2/(C_1 * V_p)))$ ( Eq. 14 )

330 — Select the size of the window for which the statistical constraints will apply.

340 — Extract the multiplicity of amplitudes, which correspond to a multiplicity of traces containing reflections from a common subsurface interface. Make similar extractions for the multiplicity of samples within the constraint window. Extract the reflection angles that correspond to the individual amplitudes. — 345

350 — Invert the extracted amplitudes and angles of incidence such that the inverted rock property contrasts ΔVp/Vp, ΔVs/Vs and Δρ/ρ, for each interface, satisfy the non-linear equation 10 while the rock property contrasts averaged over the window satisfy the constraint relationships such as Eq.13 and Eq.14.

360 — Write ΔVp/Vp, ΔVs/Vs and Δρ/ρ Volumes

Fig. 24

NON-LINEAR STATISTICALLY CONSTRAINED AVO INVERSION

This application claims the benefit of provisional application No. 60/322,315 filed Sep. 14, 2001.

TECHNICAL FIELD OF THE INVENTION

The present invention relates to methods of AVO Inversion of seismic data

BACKGROUND OF THE INVENTION

Seismic data is useful in addressing certain petroleum exploration and exploitation problems associated with determining quality of hydrocarbon reservoirs. Amplitude Variation with Offset (AVO) techniques have been applied extensively to qualitative interpretations of seismic data. Efforts have increasingly been made to go beyond the qualitative analysis and to try to estimate parameters of the subsurface target layers using AVO inversion. Use of linear equations for AVO inversion results in extensive complex calculations that are extremely time consuming. The use of true non-linear equations becomes unmanageable due to computational limitations. The use of linear equations reduces the complexity of the calculations to computer manageable levels. However, noise-induced errors that occur when linear equations are used for the AVO inversion have limited the accuracy of reservoir quality determinations.

Inversion of pre-stack seismic P-P amplitude data to yield rock property contrast values $\Delta V_p/V_p$, $\Delta V_s/V_s$, and $\Delta \rho/\rho$ and the absolute rock property values $V_p$, $V_s$ and $\rho$ (density) has been a hotly pursued goal for many years. An object has been to use rock property contrasts and absolute rock property values to predict, hydrocarbon presence and location in underground and undersea formations. Accurate determination of the degree of hydrocarbon saturation, reservoir quality, and the location of bypass pay among other useful information determinations have been elusive due to the inaccuracy and insensitivity of current industry standard techniques and methods including current industry standard AVO inversion or amplitude attribute determination methods. Traditional AVO inversion methods are most commonly based upon the use of unconstrained linear AVO equations, such as Equation 1, as given by Shuey, or other equivalent equations such as those given by Bortfield, Aki or Richards, solved on an event-by-event basis.

$$\text{Amp}(\theta) = A + B*\text{Sin}(\theta)^2 + C*\text{Tan}(\theta)^2*\text{Sin}(\theta)^2 \quad \text{Equation 1}$$

Where
$A = (1/2)*\Delta Vp/Vp + (1/2)*\Delta\rho/\rho$
$B = (1/2)*\Delta Vp/Vp - (2/g)*(2*\Delta Vs/Vs + \Delta\rho/\rho)$
$C = (1/2)*\Delta Vp/Vp$ The industry standard approach is limited by instability and inaccuracy in the inverted rock property contrasts in the presence of any amount of noise in the seismic data. The inversions also have limitations in the determination of small rock property contrasts. Further, the current inversion techniques are limited to moderate maximum angles of incidence, restricting the amplitudes associated with larger angles of incidence that are commonly present in modern acquisition long cable data sets.

The above-listed limitations hamper the petroleum exploration and exploitation field in many economical and business aspects. Specifically, the limitations make it difficult, inaccurate and expensive to determine hydrocarbon saturation, to detect residual hydrocarbons, to detect bypassed pay, to determine reservoir quality and to detect fracture presence.

SUMMARY OF THE INVENTION

The invention disclosed herein reduces the above-described limitations of prior art AVO inversion methods. The present invention discloses the use of both a non-linear inversion equation in combination with a statistically constrained inversion technique. Both aspects of the present invention add stability and accuracy to the inversion process. The invention produces results with noticeably more accuracy and stability in the face of noisy data than prior art methods using unconstrained linear equations or other traditional approaches.

The present method comprises providing a set of geologically reasonable statistical constraints, such as, but not limited to, Equations 2 and 3. Equation 2 relates the average values of any two of the rock properties to each other, so that the average rock property contrasts over a large window follow the well known rock property trends. The novel approach taken by the present invention involves simultaneously inverting the rock property contrasts for multiple interfaces and constraining the average of the rock property contrasts so that they follow relationships such as Equation 3.

The present method further comprises the use of a more stable and accurate non-linear AVO equations. The use of non-linear Equation 10 in the inversion in combination with the above-mentioned statistical constraints provides a more stable and accurate result than prior art methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other benefits and inventions can be more fully understood and a better understanding of this invention can be obtained when the following detailed description of the drawings is considered in conjunction with the following drawings in which:

FIG. 11 shows the type of geologically reasonable relationships that apply for the average rock properties in an area.

FIG. 13 shows the type of geologically reasonable relationships that apply for the average rock properties in an area. These types of relationships can be used to constrain or relate the rock property contrasts to each other for average horizons. This figure is illustrative of the statistical constraints used in the present invention

DETAILED DESCRIPTION

Figure 1:
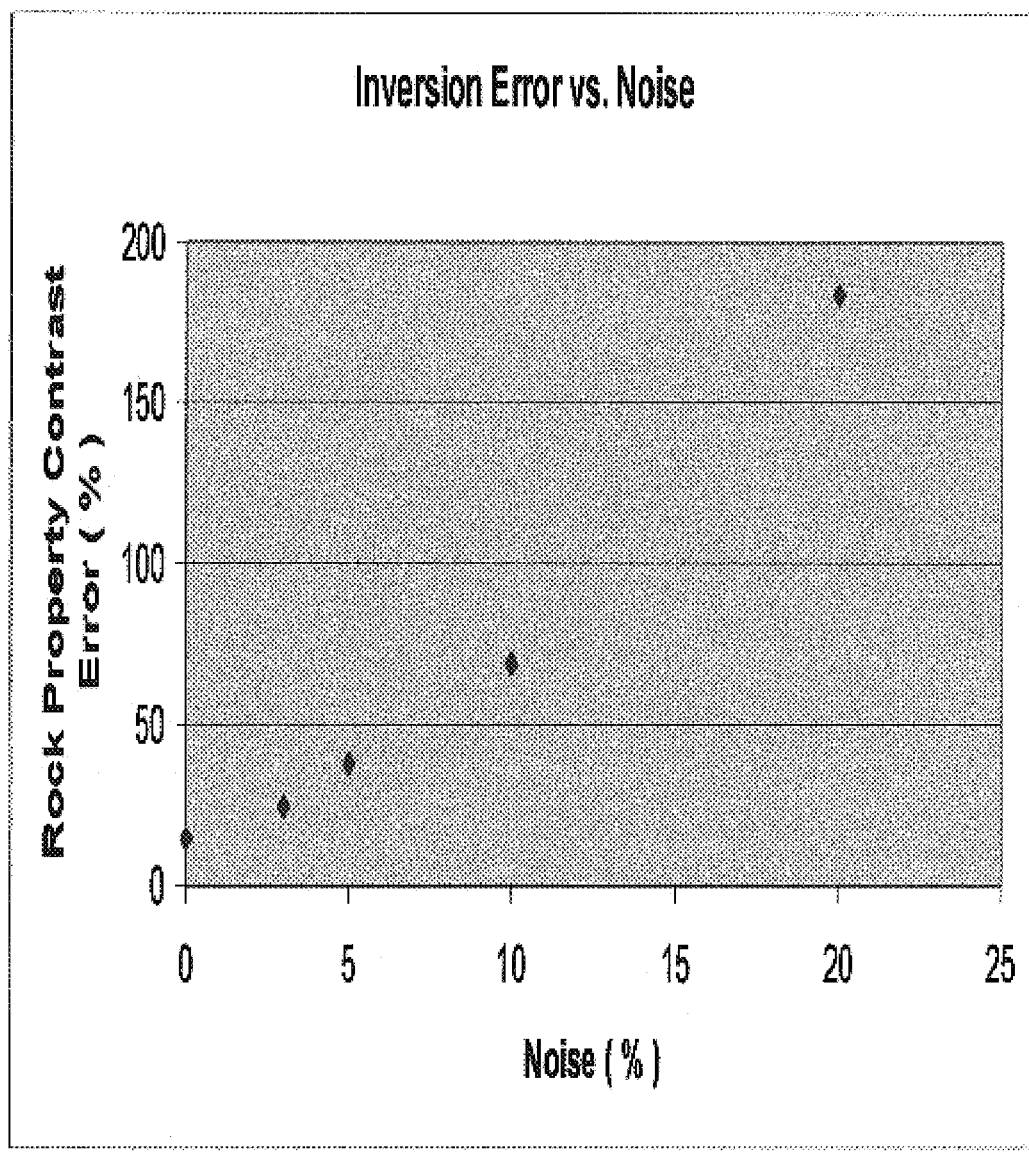
FIG. 1 shows the average relative size of the inverted rock property contrast errors relative to the actual contrast values for a case of a Gulf of Mexico ("GOM") average caprock over a porous, low-impedance, hydrocarbon-filled reservoir.

FIG. 1 shows average relative size of the inverted rock property contrast errors relative to the actual contrast values for a case of a Gulf of Mexico ("GOM") average caprock over a porous, low-impedance, hydrocarbon-filled reservoir. The exact AVO signature is generated, noise is added, and then the data is inverted to produce contrast estimates, and the contrasts are averaged. The results are shown. Clearly, the error increases rapidly as the noise level increases. The rapid increase of error in the presence of noise demonstrates the need for the present invention's improvement, since prior art methods were highly susceptible to such error.

The following outlines our identification of problems, shortcomings of attempts at solutions, and our unique inventive solution:

It has been found that certain of these limitations spring from the inability to determine accurately the individual AVO inversion parameters, when the inversion is performed using a linear equation on an unconstrained, interface-by-interface basis. If the amplitudes are restricted to those for angle of incidence less than thirty degrees, only two of the parameters are established with any accuracy and one of the parameters may not be computed at all. If amplitudes for greater than thirty degrees are allowed, estimates for the undetermined parameter might be made. However, the accuracy of calculations using these estimates are sensitive to noise to such a degree that the resulting inversion of the AVO parameters to rock property contrasts produces results that may range from unstable to useless.

Inversion of pre-stack seismic P-P amplitude data to yield rock property contrasts $\Delta Vp/Vp$, $\Delta Vs/Vs$ and $\Delta\rho/\rho$ values, or values of the absolute rock property values Vp (pulse-wave velocity), Vs (shear-wave velocity) and $\rho$(density) has been found to be desirable. It is believed by applicants that these rock property contrasts, or absolute rock property values, can be used far more accurately and sensitively to predict the degree of hydrocarbon saturation, reservoir quality, hydrocarbon presence and location of bypass pay, than current industry standard AVO or amplitude attributes or methods as examples will show. Attempts to achieve the desired result have been difficult in part because of the instability and inaccuracy of traditional AVO inversion methods (see FIG. 1) based on the use of unconstrained linear AVO equations, such as Equation 1 or its equivalent, solved on an event-by-event basis.

Some of the noted problems with such an approach are as follows

The instability and inaccuracy of the inverted rock property contrasts in the presence of any amounts of noise in the seismic data (see FIG. 1).

Limitation of inversions to small rock property contrasts.

Figure 9:
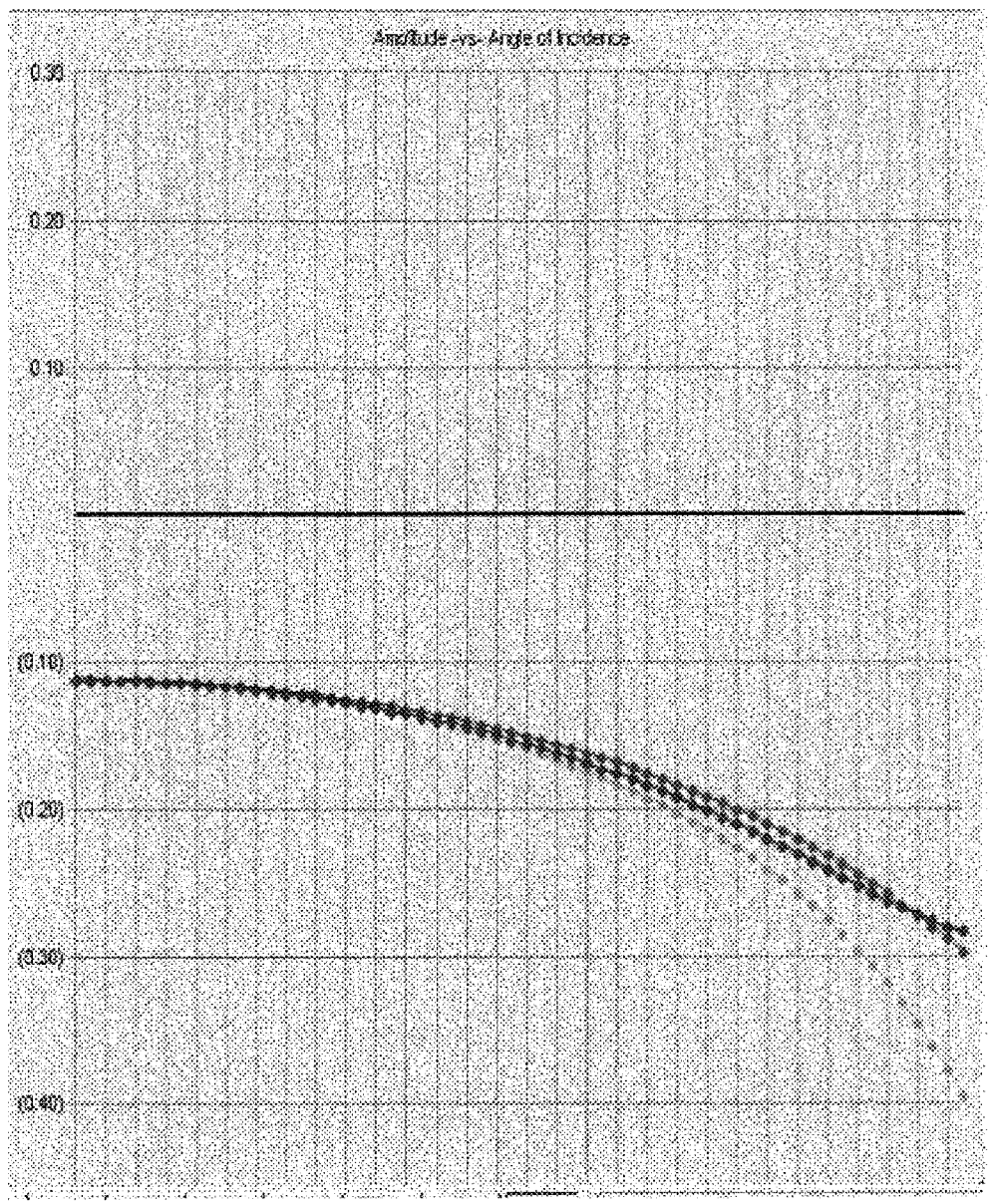
FIG. 9 shows the exact amplitude as a function of angle of incidence signature in as a dashed line (red), the linearized equivalent (given by Equation 1) as hidden line (green) and the non-linear (given by Equation 10) as a phantom line (blue). The data relates to a GOM pay filled reservoir with an average shale caprock. The maximum angle of incidence is sixty degrees.

Limitation of inversions to moderate maximum angles of incidence, restricting amplitudes associated with larger angle of incidence that are commonly present in modern acquisition long cable data sets (see FIG. 9).

The types of desirable business solutions prohibited by these limitations:

Hydrocarbon saturation determination.

Residual hydrocarbon detection.

Bypassed pay detection.

Reservoir quality determination.

Detection of fracture presence.

Proposed responses to the instability problem identified here might be to restrict the inversion process in either of two ways:

First to a solution which results in only combinations of rock property contrasts such as the AVO intercept (intercept=(1/2)*ΔVp/Vp+(1/2)*Δρ/ρ) or AVO slope (slope=(1/2)*ΔVp/Vp−2/g$^2$*(2*ΔVs/Vs+Δρ/Σ), Δ(Vp/Vs)/(Vp/Vs), Poisson ratio contrast and others.

$$\text{Intercept} = \frac{1}{2}\left[\frac{\Delta V_p}{V_p}\right] + \frac{1}{2}\left[\frac{\Delta \rho}{\rho}\right] \qquad \text{AVO Intercept Equation}$$

$$\text{Slope} = \frac{1}{2}\left[\frac{\Delta V_p}{V_p}\right] - \frac{2}{g^2}\left\{2\left[\frac{\Delta V_s}{V_s}\right] + \frac{\Delta \rho'}{\rho}\right\} \qquad \text{AVO Slope Equation}$$

$$\frac{V_p}{V_s}\text{Contrast} = \frac{\Delta\left[\frac{V_p}{V_s}\right]}{\frac{V_p}{V_s}} \qquad \text{Poisson Ratio Contrast}$$

This restriction might be accomplished by using the amplitude data that are inverted only to the data, having an angle of incidence, less than the 30 degrees. This corresponds to using the first two terms of Equation 1 only. Such, two term, AVO inversion results are found to be ineffective in addressing a broad range of critical exploration/exploitation problems such a those described above (and as shown in FIGS. 2, 3 and 4). The above described limitations spring from the inability to accurately determine all three of the individual AVO parameters, present in known linear equations, such as Equation 1 or its equivalent, when the AVO inversion is performed on an unconstrained, interface by interface basis, as shown in FIG. 1. If amplitudes are restricted to only those whose corresponding angles of incidence are less than 30 degrees, then the third parameter, C, cannot be determined at all. If amplitudes associated with angles of incidence greater than 30 degrees are present, then estimates for the third parameter can be made, but it is sensitive to noise to a degree that for real data the resulting inversion of the AVO parameters A, B and C to rock property contrasts using Equation 2 gives unstable to useless results as indicated by FIG. 1.

Figure 2:
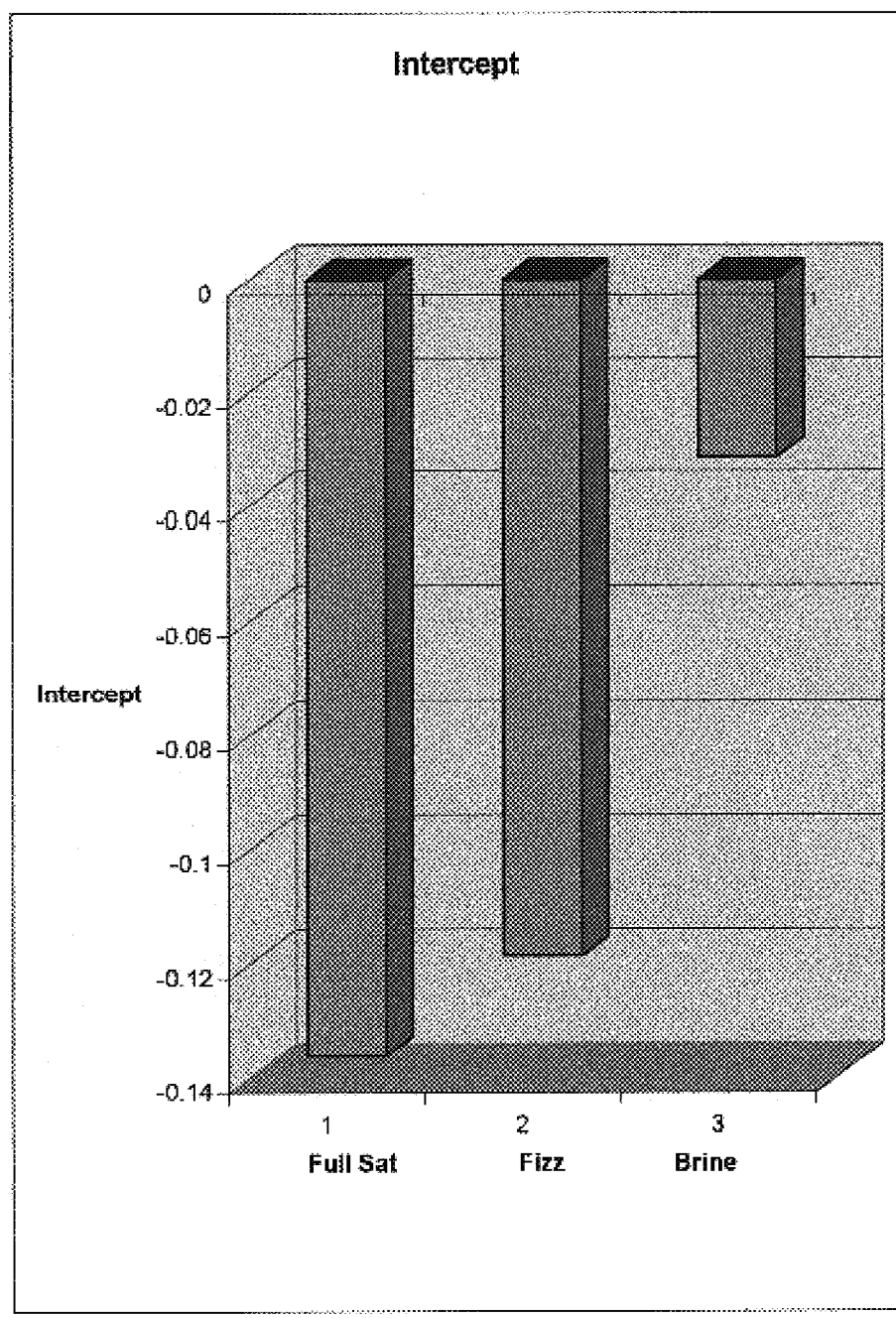
FIG. 2 shows the industry standard AVO attribute "Intercept," determined using Equation 1, for the cases of: (1) a fully saturated GOM pay sand with average cap rock, (2) the same cap rock and reservoir but with 10% hydrocarbon saturation (fizz water), and (3) the brine filled case.

FIG. 2 shows the industry standard AVO attribute "Intercept," determined using Equation 1, for the cases of: (1) a fully saturated GOM pay sand with average cap rock, (2) the same cap rock and reservoir but with 10% hydrocarbon saturation (fizz water), and (3) the brine filled case.

Figure 3:
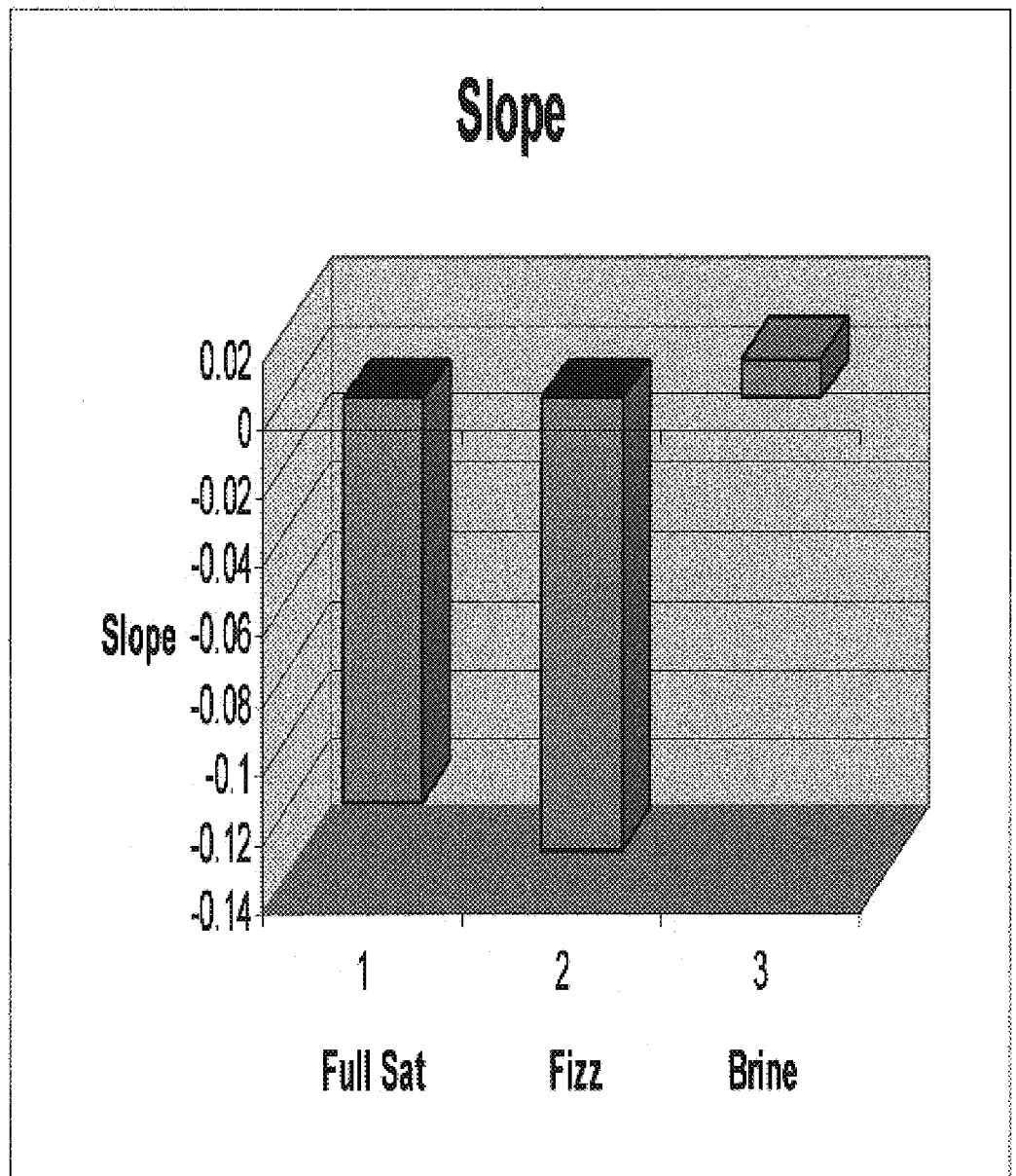
FIG. 3 shows the industry standard AVO attribute "Slope," determined using Equation 1, for the cases of: (1) a fully saturated GOM pay sand with average cap rock, (2) the same cap rock and reservoir but with 10% hydrocarbon saturation (fizz water), and (3) the brine filled case.

FIG. 3 shows the industry standard AVO attribute "Slope," determined using Equation 1, for the cases of: (1) a fully saturated GOM pay sand with average cap rock, (2) the same cap rock and reservoir but with 10% hydrocarbon saturation (fizz water), and (3) the brine filled case.

Figure 4:
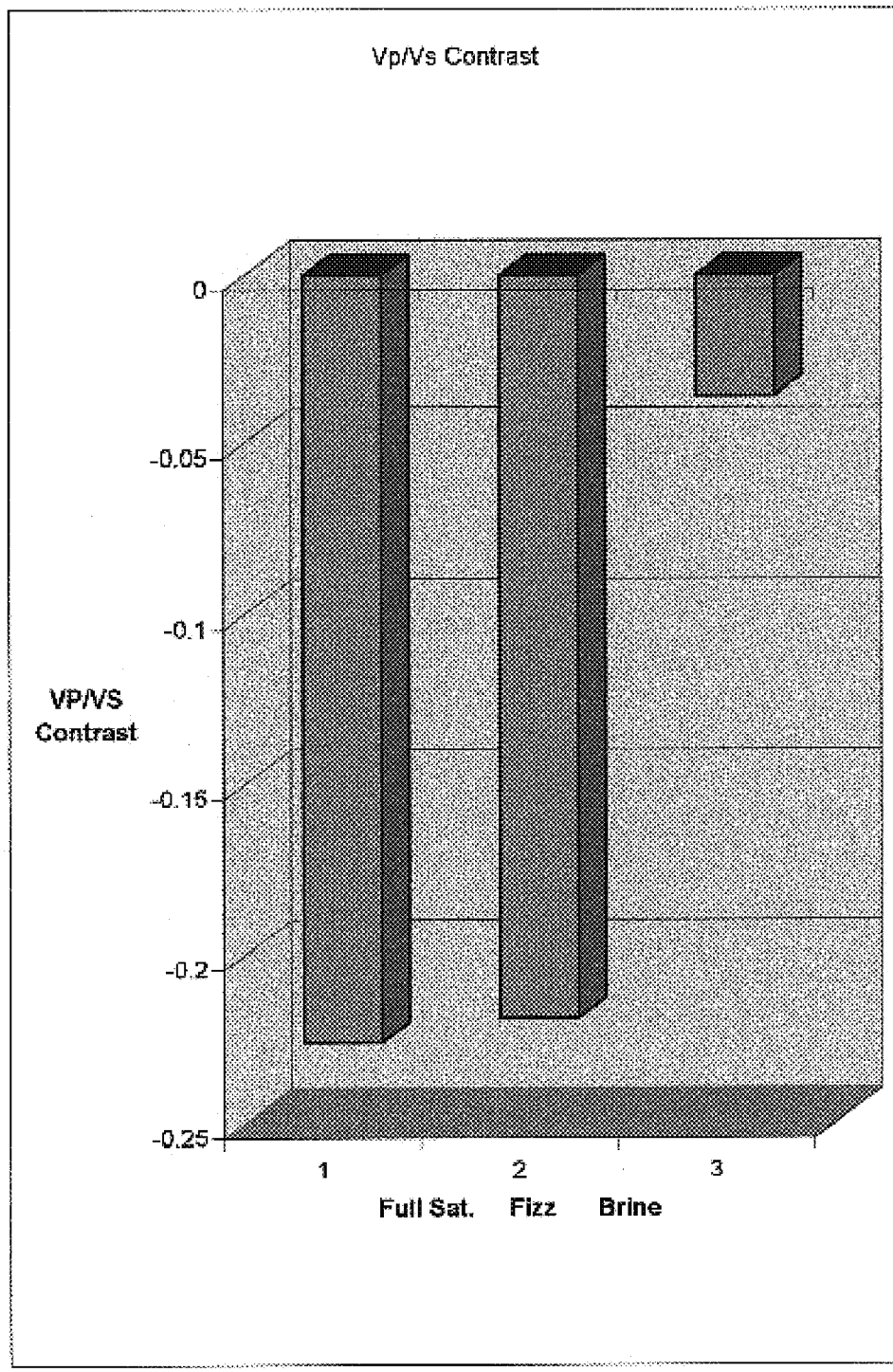
FIG. 4 shows the industry standard AVO attribute "$V_p/V_s$ Contrast," determined using Equation 1, for the cases of: (1) a fully saturated GOM pay sand with average cap rock, (2) the same cap rock and reservoir but with a 10% hydrocarbon saturation (fizz water), and (3) the brine filled case.

FIG. 4 shows the industry standard AVO attribute "$V_p/V_s$ Contrast," determined using Equation 1, for the cases of: (1) a fully saturated GOM pay sand with average cap rock, (2) the same cap rock and reservoir but with a 10% hydrocarbon saturation (fizz water), and (3) the brine filled case.

What these figures show is that, although some combinations of rock property contrasts might show some sensitivity to hydrocarbon presence, they are in general insensitive to the degree of saturation. This result corresponds to using only the first two terms of Equation 1. These industry standard, two-term AVO inversion results are inaccurate and ineffective in determination of hydrocarbon saturation, detection of residual hydrocarbons, detection of bypassed pay, determination of reservoir quality and detection of fracture presence. Although some combinations of rock property contrasts show some sensitivity to hydrocarbon presence, they are generally insensitive to the degree of saturation. This insensitivity makes it difficult, if not impossible, to distinguish between small, uneconomic amounts of pay and large, economic amounts of pay when using real data, because real data is noisy data. Applicants consider this identified problem to be one of the most important problems facing the petroleum exploration and exploitation industry today.

Figure 5:
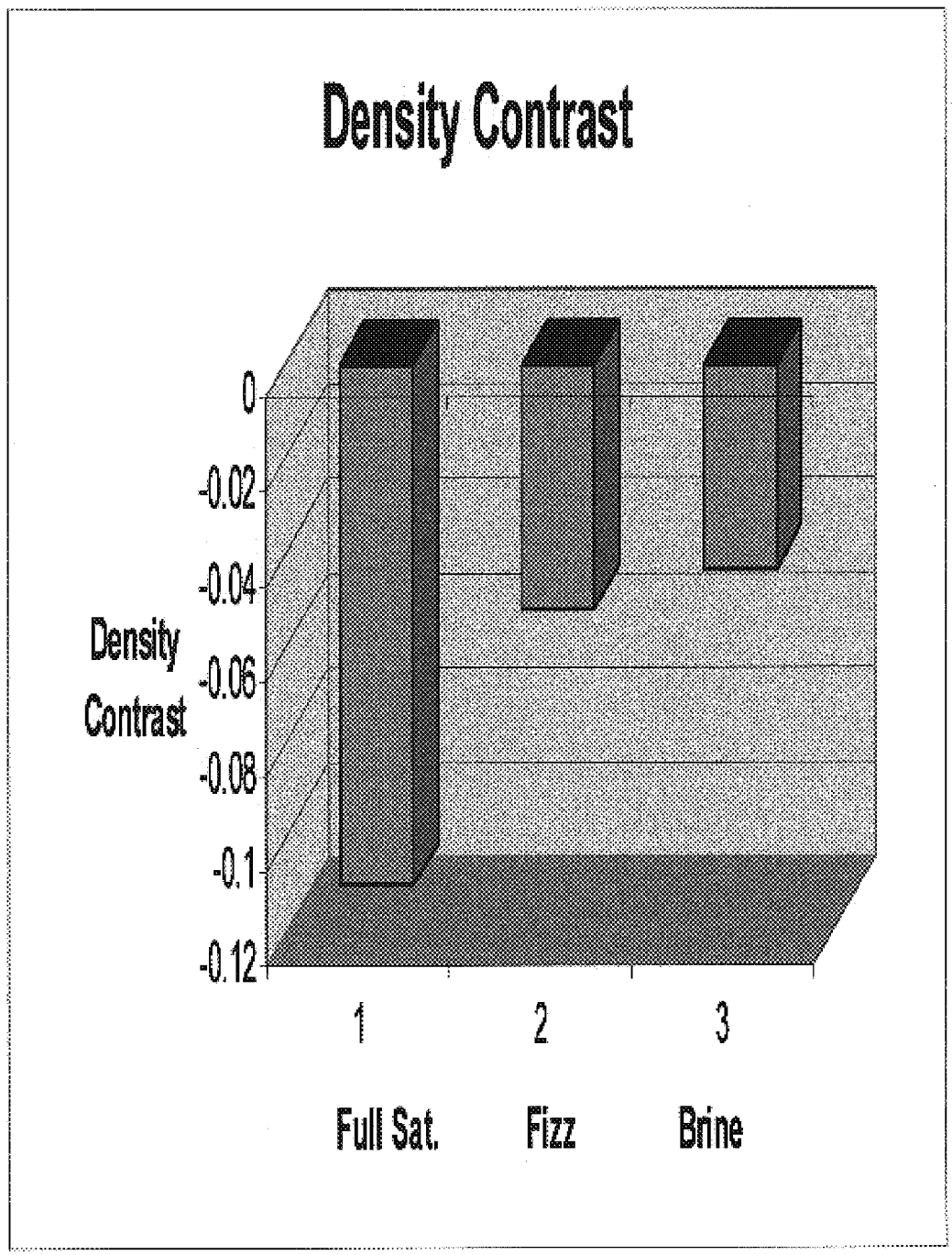
FIG. 5 shows the Density Contrast resulting from AVO inversion, for the cases of: (1) a fully saturated GOM pay sand with average cap rock, (2) the same cap rock and reservoir but with 10% hydrocarbon saturation (fizz water), and (3) the brine filled case.

FIG. 5 shows the density contrast for the same cases as with FIGS. 2, 3 and 4, namely: (1) a fully saturated GOM pay sand with average cap rock, (2) the same cap rock and reservoir but with 10% hydrocarbon saturation (fizz water), and (3) the brine filled case. FIG. 5 compared and contrasted to FIGS. 2, 3, and 4 demonstrates the ability of the density contrast to discriminate between certain uneconomic, partially-saturated cases and economic, pay-filled cases. Without accurate density contrast data there is little discrimination between saturated hydrocarbon layers and fizz water layers. Note the indication of very little difference between a pay-filled case and a 10% saturation case in FIGS. 2, 3 and 4. While the results of prior art methods as demonstrated in FIGS. 2, 3, and 4 show some sensitivity to hydrocarbon presence, they are, in general, insensitive to the degree of saturation making it difficult, if not impossible, to distinguish between small, uneconomic amounts of pay and large economic amounts when using the type of noisy data, one finds in the real world. What should be clear is that with the density contrast there is sensitivity to not only the presence of hydrocarbons but also the degree of hydrocarbon saturation. Specifically the density contrast can be shown to be directly proportional to the hydrocarbon saturation.

A second limited solution may consists of applying a hard constraint such as Equation 2 that relates two rock properties to each other, effectively reducing the number of data-derived parameters from 3 to 2.

Of the 3 AVO parameters given in Equation 1, A, B and C, the least stable parameter is C. By using a relationship such as Equation 2, the contrast of the two rock layers that follow Equation 2 will be given by Equation 3. Equation 2 shows the type of relationship that is reasonably inferred between the P-wave velocity ($V_p$) and the density (ρ) for average subsurface layers. This is an industry standard Gardner's-type relationship.

$$\rho = \alpha V_p^\beta \qquad \text{Equation 2}$$

Of the three AVO parameters A, B, and C given in Equation 1, C is the least stable. By using a relationship such as Equation 2, the contrast of the two layers that follow Equation 2 will be given by Equation 3. Thus, such a second limited solution may consist of applying a hard constraint, such as Equation 2, that relates two rock property contrasts ($V_p$, $V_s$, or ρ) to each other for every interface, reducing the number of data-derived parameters from three to two.

Equation 3 shows the relationship between the rock property contrasts of two average layers.

$$\frac{\Delta \rho}{\rho} = \beta\left[\frac{\Delta V_p}{V_p}\right] \qquad \text{Equation 3}$$

This means that only two of the AVO parameters, such as A and B of Equation 1, need to be determined directly from data.

The three AVO parameters, A, B, and C, would then be given by Equations 4, 5 and 6 respectively.

$$A = \frac{1}{2}(1+\beta)\left[\frac{\Delta V_p}{V_p}\right] \qquad \text{Equation 4}$$

$$B = \left[\frac{1}{2} - \frac{2\beta}{g^2}\right]A - \frac{4}{g^2}\left[\frac{\Delta V_s}{V_s}\right] \qquad \text{Equation 5}$$

-continued $$C = \frac{1}{2}\left[\frac{\Delta V_p}{V_p}\right] \quad \text{Equation 6}$$

Equations 7, 8, and 9 can be used to solve for the three rock property contracts.

$$\frac{\Delta V_p}{V_p} = 2A\beta(1+\beta) \quad \text{Equation 7}$$

$$\frac{\Delta V_s}{V_s} = g^2\left[4A\beta + \frac{B}{4}\right] \quad \text{Equation 8}$$

$$\frac{\Delta\rho}{\rho} = 2A(1+\beta) \quad \text{Equation 9}$$

Still, it has been observed, as demonstrated in FIG. 6, that another type of error will be made using hard constraint assumptions in certain situations such as for a low impedance Gulf of Mexico pay sand. These errors, in general, are large enough to obscure and overwhelm the results, making such methods ineffective for a large class of exploration and exploitation problems.

Figure 6:
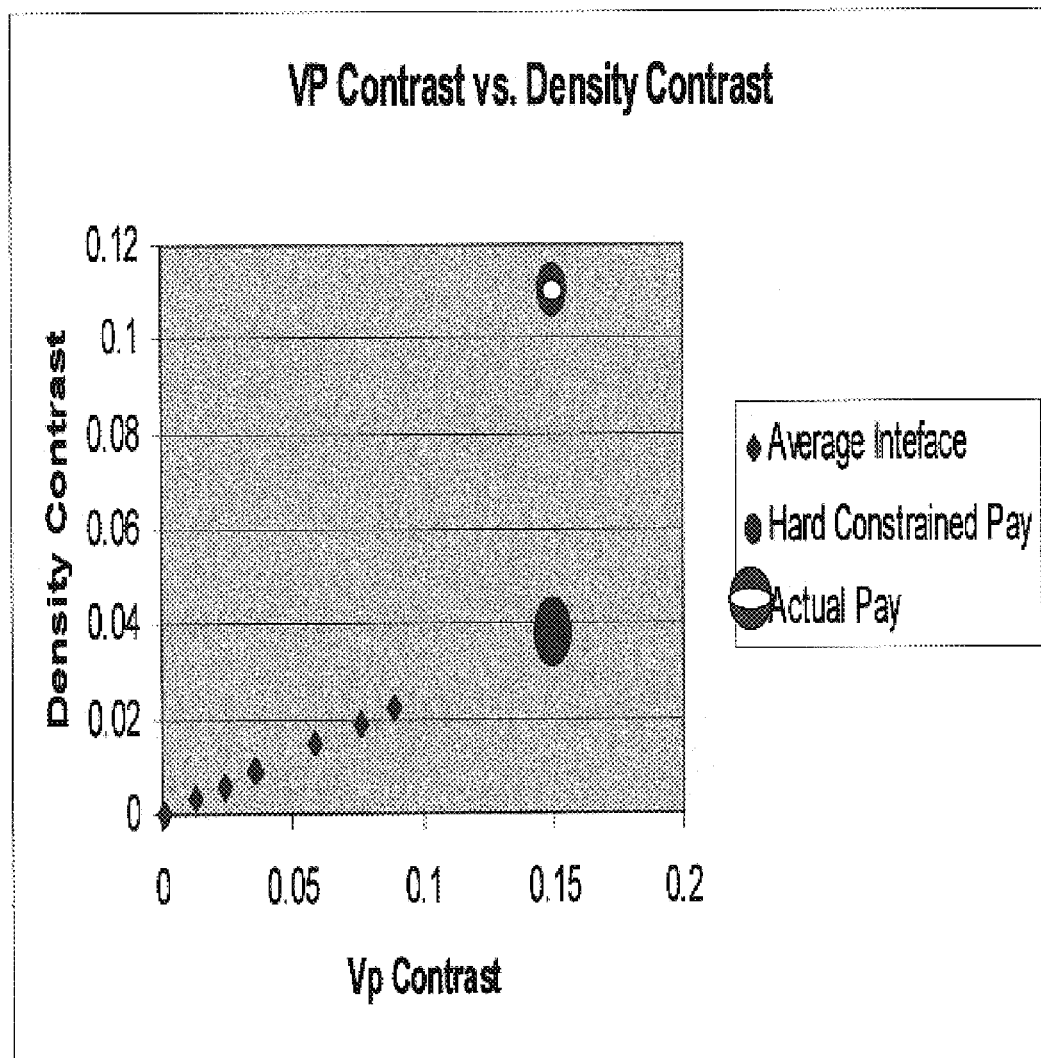
FIG. 6 shows the Density Contrast vs. the $V_p$ Contrast for the case of average rock property values.

FIG. 6 shows the Density Contrast vs. the $V_p$ Contrast for the case of average rock property values. Rock interfaces made up of average rock types, such as shale/shale or shale/brine sands will have a rock property contrasts falling along the linear trend line as shown in the FIG. 6. Using a hard constraint, such as Equation 2 and then Equation 3, reduces the parameters that need to be inverted from the data from three to two. The third rock property contrast can then be derived from the other two. The weakness of this method is demonstrated by FIG. 6. For a shale/hydrocarbon reservoir interface, the large hollow oval point in FIG. 6 indicates the results using actual pay density contrast and $V_p$ contrast. The large solid oval point in FIG. 6 indicates the result when using a hard-constrained density contrast with the actual $V_p$ contrast. The large error produced by using the hard constraint is obvious. An event which should stand out, the pay case, is reduced to only a slightly anomalous feature using such methods.

Figure 7:
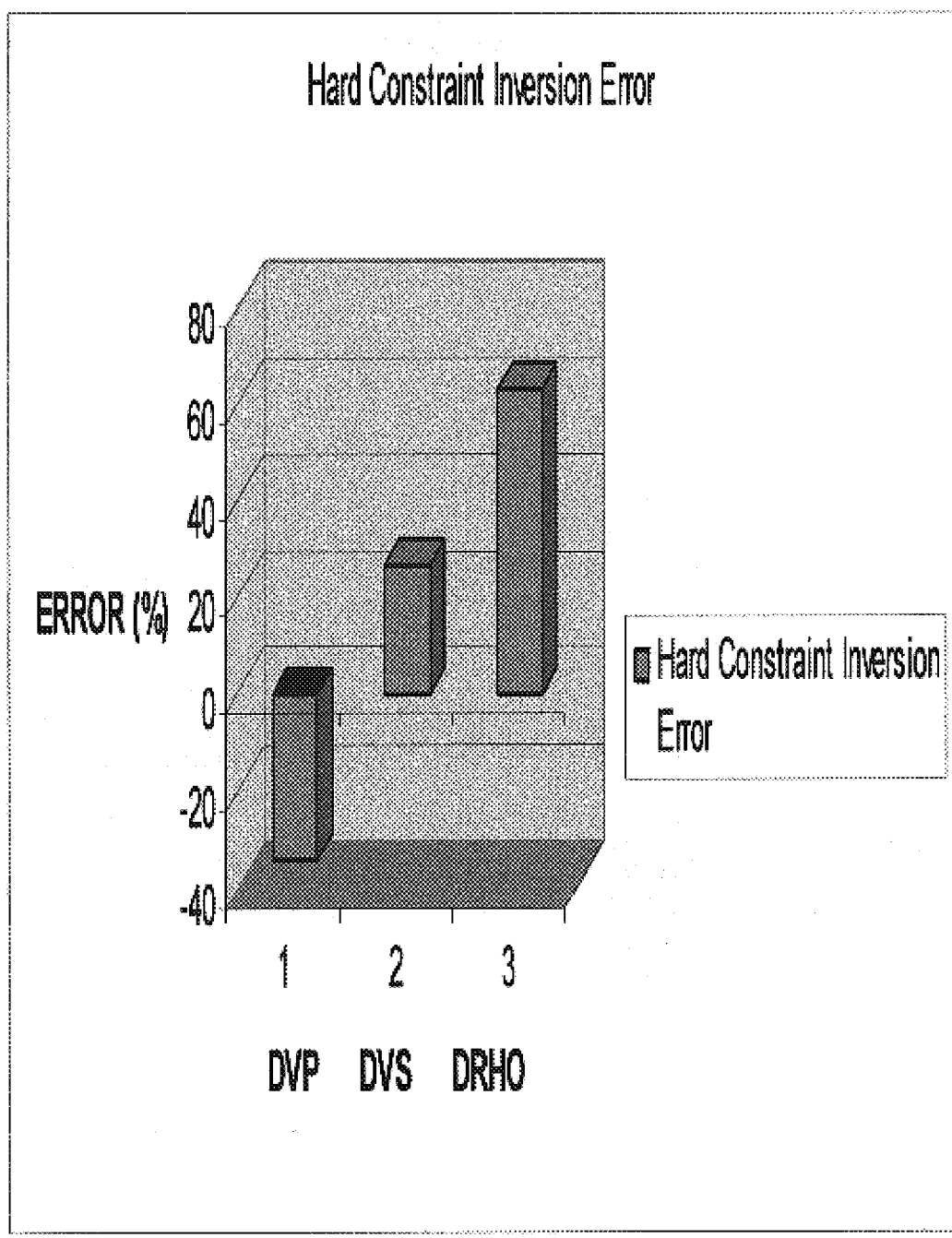
FIG. 7 shows the type of error produced by assuming a hard constraint (one which applies strictly for the rock properties of each horizon) given by Equations 2, 3, 4, 5, 6, 7, 8 and 9.

FIG. 7 shows the type of error produced when assuming a hard constraint (one which applies strictly for the rock properties of each horizon) given by Equations 2, 3, 4, 5, 6, 7, 8 and 9. The error in percent is given for each of the three rock property contrasts $DV_p$, $DV_s$, and $D\rho$. for good quality reservoirs filled with hydrocarbon versus poor quality reservoirs filled with brine.

The limitations of the method of using hard constraints, lie in the assumptions that must be made concerning how any two rock properties are related to each other. The assumptions are only correct for a limited class of layers. The assumptions might be accurate for the average rocks in a region such as shales and brine-filled sands or another assumption might be accurate for hydrocarbon-filled layers such as pay-filled sand. The assumptions do not hold for both classes. Hence, the results of the inversion will be erroneous for either the majority of layers or for the case that is truly of importance, hydrocarbon-filled reservoirs. Additionally, when using these assumptions, layers that appear anomalous are frequently non-anomalous and layers which appear non-anomalous can actually be anomalous and possibly hydrocarbon-filled.

Both the method of using only a limited angular range for the data and the method of imposing a hard constraint on the calculations produce final results that are extremely limited in their ability to discriminate between partially versus fully-saturated reservoirs, good quality versus poor quality reservoirs and hydrocarbon versus brine-filled reservoirs.

FIGS. 2, 3 and 4 demonstrate deficiencies in the two-term inversion method obtained using limited angular data and FIGS. 6 and 7 demonstrate the deficiencies for the hard-constrained inversion.

As a reservoir is produced, small amounts of hydrocarbon are left behind. This residue, or partially hydrocarbon-saturated fluid, cannot be efficiently detected using the traditional AVO methods or by using the proposed solutions as described above. Its an object of the present invention to disclose a method for distinguishing residual hydrocarbon zones from fully saturated zones. Residual hydrocarbons, also known as "fizz water," are clearly distinguishable from fully saturated zones using the present invention.

It is a further object of the present invention to provide a method for distinguishing between small, uneconomic amounts of pay and large, economic amounts of pay when using noisy data.

The invention disclosed herein removes the above-described limitations of AVO inversion methods. The present invention discloses the use of both a non-linear inversion equation in combination with a statistically constrained inversion technique. Both elements of the present invention add stability and accuracy to the inversion process. The invention produces results with noticeably more accuracy and stability in the face of noisy data than traditional approaches and methods using unconstrained linear equations or methods using hard constraints for applying the linear equation at each target interface.

The present method comprises providing a set of geologically reasonable statistical constraints, sometimes referred to herein as soft constraints, such as, but not limited to, Equations 2 and 3 applied as an average over a range of target layers. In this unique approach, Equation 2 is used to relate the average values of any two of the rock properties to each other, so that the average rock property contrasts over a large window follow known rock property trends in the area of interest. The novel approach taken by the present invention involves simultaneously inverting the rock property contrasts for multiple interfaces and constraining the average of the rock property contrasts so that they follow relationships such as Equation 3.

The present method further comprises the use of a more stable and accurate non-linear AVO inversion equation. The use of a non-linear, such as Equation 10 set forth below, in the inversion and in combination with the above-mentioned statistical constraints, provides a more stable and accurate result than other methods considered as possible solutions to existing problems.

$$\begin{aligned}
Amp(\Theta) = {} & D00 + \\
& D11 \cdot \sin(\Theta)^2 + \\
& D12 \cdot \tan(\Theta)^2 \sin(\Theta)^2 + \\
& D20 \cdot \tan(\Theta)^4 + \\
& D21 \cdot f\sin(\Theta)^2 \cos(\Theta) + \\
& D22 \cdot \frac{\sin(\Theta)^2}{f\cos(\Theta)} + \\
& D23 \cdot \frac{\sin(\Theta)^4}{f\cos(\Theta)} + \\
& D24 \cdot \frac{\sin(\Theta)^6}{f\cos(\Theta)}
\end{aligned} \quad \text{Equation 10}$$

$$D00 = \frac{1}{2}\left[\frac{\Delta V_p}{V_p}\right] + \frac{1}{2}\left[\frac{\Delta\rho}{\rho}\right] - \frac{1}{4}\left[\frac{\Delta V_p}{V_p}\right]^2 - \frac{1}{4}\left[\frac{\Delta\rho}{\rho}\right]^2 + \ldots$$

-continued $$D11 = \frac{1}{2}\left[\frac{\Delta V_p}{V_p}\right] - \frac{2}{g^2}\left\{2\left[\frac{\Delta V_s}{V_s}\right] + \frac{\Delta \rho}{\rho}\right\} -$$
$$\frac{2}{g^2}\left\{\left[\frac{\Delta V_s}{V_s}\right]\left[\frac{\Delta \rho}{\rho}\right] - \frac{1}{2}\left[\frac{\Delta \rho}{\rho}\right]^2 + \left[\frac{\Delta V_s}{V_s}\right]^2\right\} +$$
$$\frac{1}{4}\left[\frac{\Delta V_p}{V_p}\right]^2$$

$$D12 = \frac{1}{2}\left[\frac{\Delta V_p}{V_p}\right] + \frac{1}{4}\left[\frac{\Delta V_p}{V_p}\right]^2$$

$$D20 = \frac{1}{2}\left[\frac{\Delta V_p}{V_p}\right]^2$$

$$D21 = \frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}$$

$$D22 = -\frac{1}{4}\left[\frac{\Delta \rho}{\rho}\right]^2$$

$$D23 = \frac{1}{g^2}\left\{2\left[\frac{\Delta V_s}{V_s}\right]\left[\frac{\Delta \rho}{\rho}\right] + \left[\frac{\Delta \rho}{\rho}\right]^2\right\}$$

$$D24 = -\frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}$$

$$f = \sqrt{(g^2 - \sin(\Theta)^2)}$$

Rock property contrasts are found which simultaneously satisfy Equation 10 for every target layer interface while at the same time requiring equations representing statistical or "soft" constraints, apply to the averages only. Examples of equations for that relate one rock property value to another to produce possible soft constraints are set forth below as Equations 11, 12, 13 and 14:

$$\rho_{ave} = \alpha * V_{Pave}\beta \qquad \text{Equation 11}$$

$$V_{Save} = C1 * V_{Pave} + C2 \qquad \text{Equation 12}$$

$$\left[\frac{\Delta \rho}{\rho}\right]_{ave} = \beta * \left[\frac{\Delta V_p}{V_p}\right]_{ave} \qquad \text{Equation 13}$$

$$\left[\frac{\Delta V_s}{V_s}\right]_{ave} = \left[\frac{1}{1 + \left[\frac{C2}{C1 * V_p}\right]}\right]\left[\frac{\Delta V_p}{V_p}\right]_{ave} \qquad \text{Equation 14}$$

The averages are defined over a range or sliding window over the target layers of interest in a formation centered around the particular event or interface being inverted. Thus, the events for which the linear equation is solved on an event by event basis are subjected to a soft constraint or average parameter over the event layer and surrounding layers in the formation.

Figure 8:
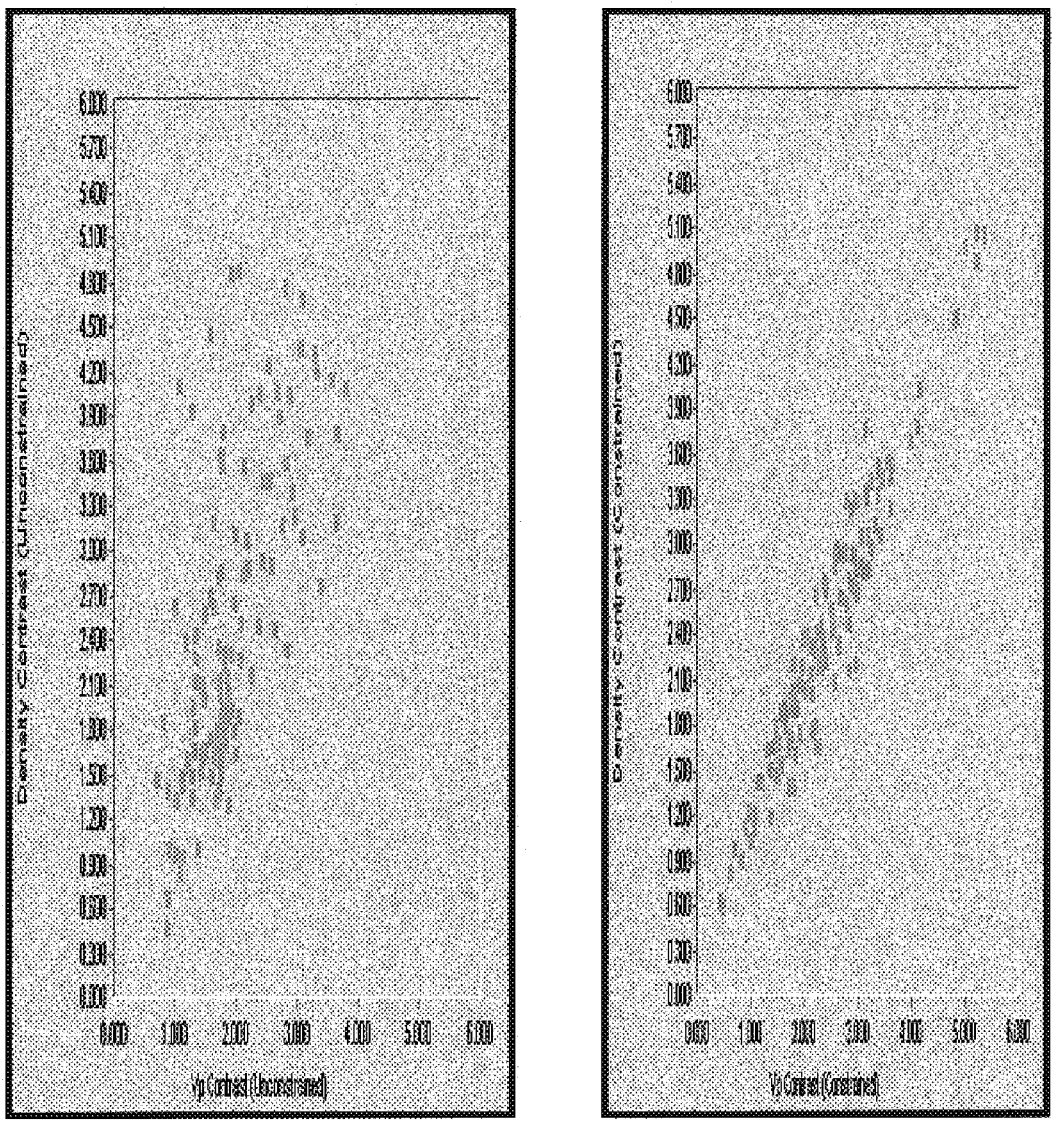
FIG. 8 shows, on the left, the resulting rock property contrasts $\Delta V_p/V_p$ and $\Delta\rho/\rho$ of an unconstrained inversion versus the same data inverted, on the right, using a constrained inversion. The constraints that were used are given in equations 2 and 3.

FIG. 8 shows, on the left, the resulting rock property contrasts $\Delta V_p/V_p$ and $\Delta \rho/\rho\rho$ of an unconstrained inversion versus the same data inverted, on the right, using a constrained inversion. The constraints that were used are given in Equation 2 (average version for soft constraint purposes shown in Equation 11) and Equation 3 (average version for soft constraint purposes shown in Equation 13). The zone which was inverted consisted of a shale/brine sand interface wherein the rock properties were known to follow the averages given in Equations 11 and 13. The corresponding rock property contrasts should follow a linear trend line falling along the tight cluster of points on the right. This was determined using the well logs. The scatter of the points on the left is a result of instability of the prior inversion method in the presence of noise. The scatter of the points shown on the left corresponds to relative error size of over 100%.

FIG. 9 shows the exact amplitude as a function of angle of incidence, shown as a dashed line, the linearized equivalent (given by Equation 1) as hidden line and the non-linear equation (given by Equation 10) and shown as a phantom line. The data relates to a GOM pay filled reservoir with an average shale caprock. The maximum angle of incidence is sixty degrees. The present method is far more accurate at larger angles of incidence than the prior art method. Accuracy at larger angles of incidence is vital due to the larger angles of incidence commonly present in modern acquisition long cable data sets.

Figure 10:
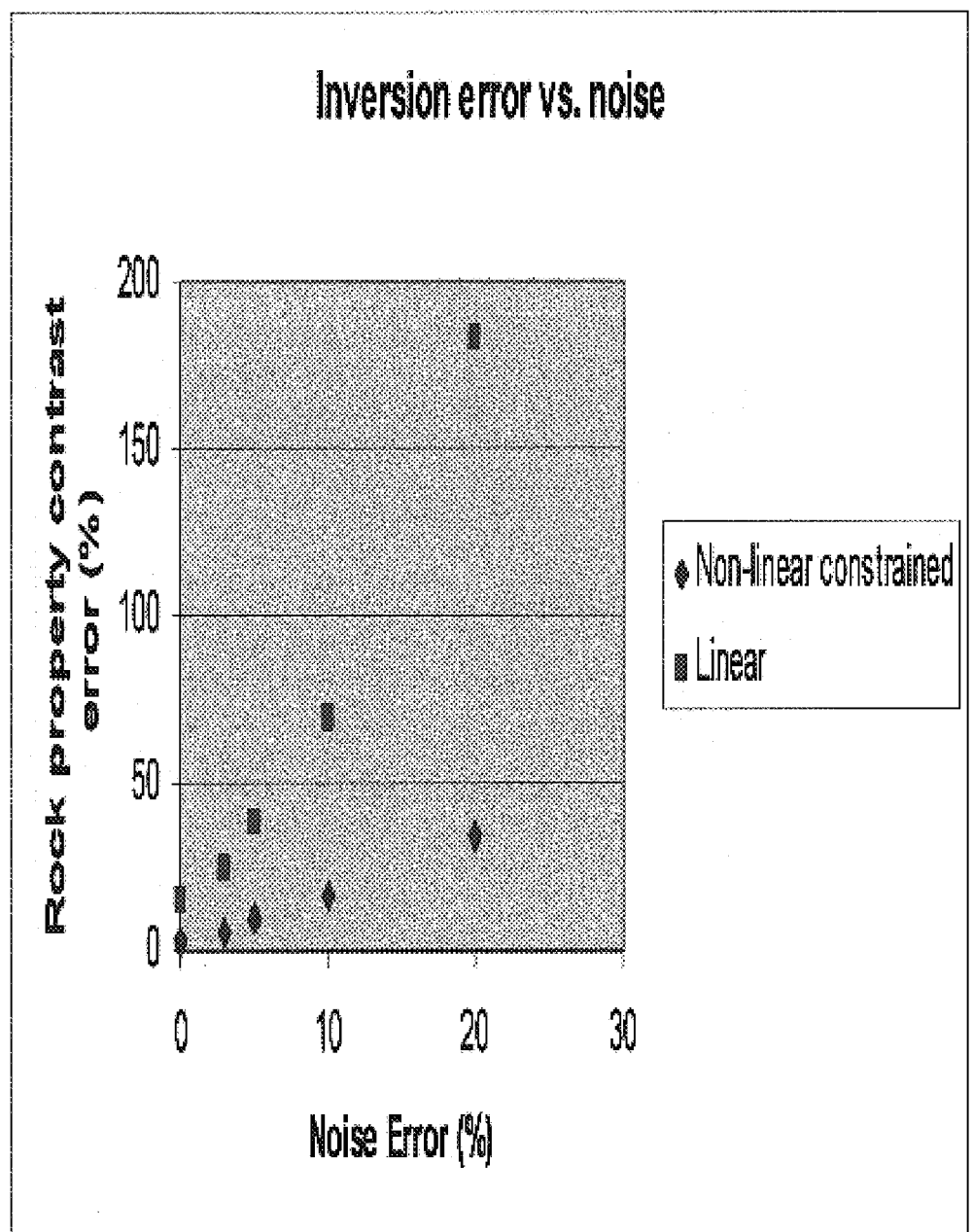
FIG. 10 shows the inversion error for the linear unconstrained vs. nonlinear statistically constrained case as a function of noise.

FIG. 10 shows the inversion error for the linear unconstrained vs. nonlinear statistically constrained case as a function of noise. The present statistically constrained AVO inversion method is dramatically more accurate than the unconstrained method in the presence of any noise, as is likely to be present in real data.

FIG. 11 shows illustrative examples of types of geologically reasonable relationships that apply for the average rock properties in an area. Geological formation layers, schematically represented as horizontal lines in FIG. 11, are constrained with statistically accurate average constraints given by Equations 11 and 12.

Figure 12:
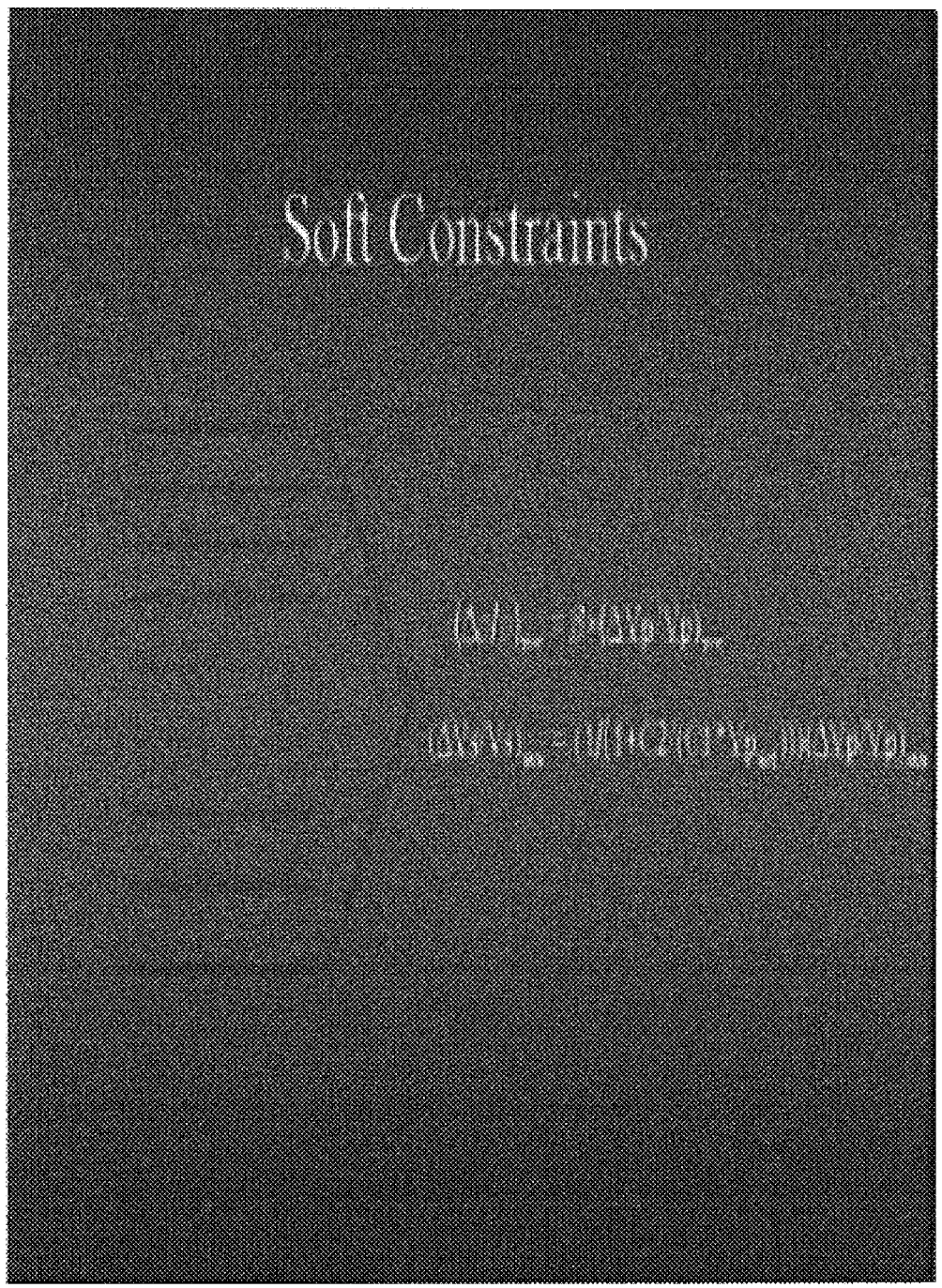
FIG. 12 shows the type of geologically reasonable relationships that apply for the average rock properties in an area. These types of relationships can be used to constrain or relate the rock property contrasts to each other for average horizons.

FIG. 12 shows illustrative examples of types of geologically reasonable relationships that may apply for the average rock properties in another area. These types of relationships can be used to constrain or relate the rock property contrasts to each other for average horizons in the area. Geological formation layers, schematically represented as horizontal lines in FIG. 11, are constrained with statistically accurate average constraints given by Equations 13 and 14.

Figure 13:
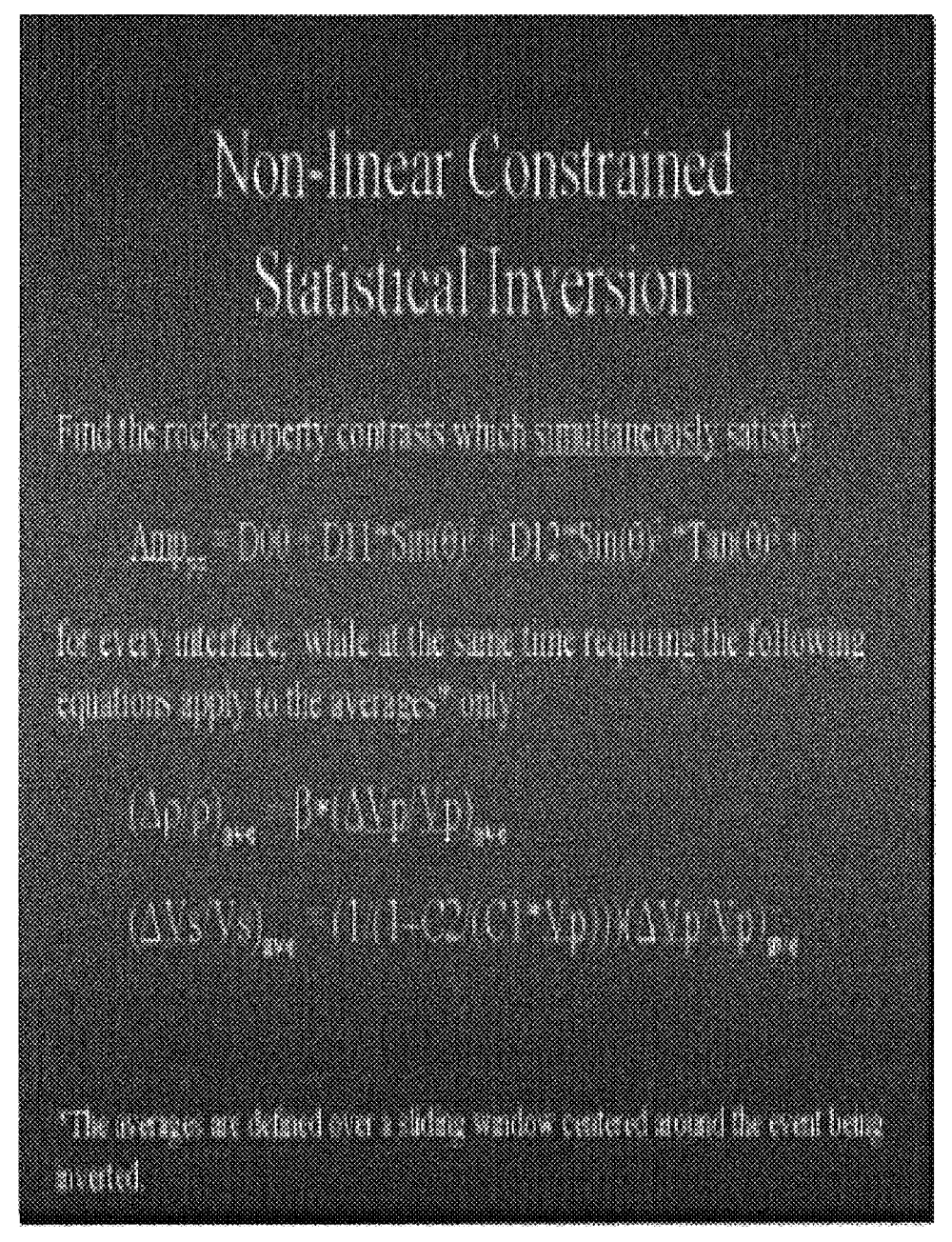

FIG. 13 shows an illustrative example of the non-linear Equation 10 solved for the rock property contrasts that simultaneously satisfy Equation 10 at every interface and at the same time requiring the statistical constraints applied to the averages only as disclosed in the present invention.

FIGS. 11, 12 and 13 illustrate examples (presented in color as the only way to demonstrate the nature of the results) of the statistical constraints found to be useful in the present inventive method. FIGS. 11, 12 and 13 show a series of layers, most of which follow the equations describing the average properties (the black lines) as shown in FIG. 11. The smaller number of layers which are shown in red, correspond to the anomalous layers such as pay-filled reservoirs. These layers do not follow the rock property relationships given by Equation 2. The contrast between two average layers is given by Equation 3.

Figure 14:
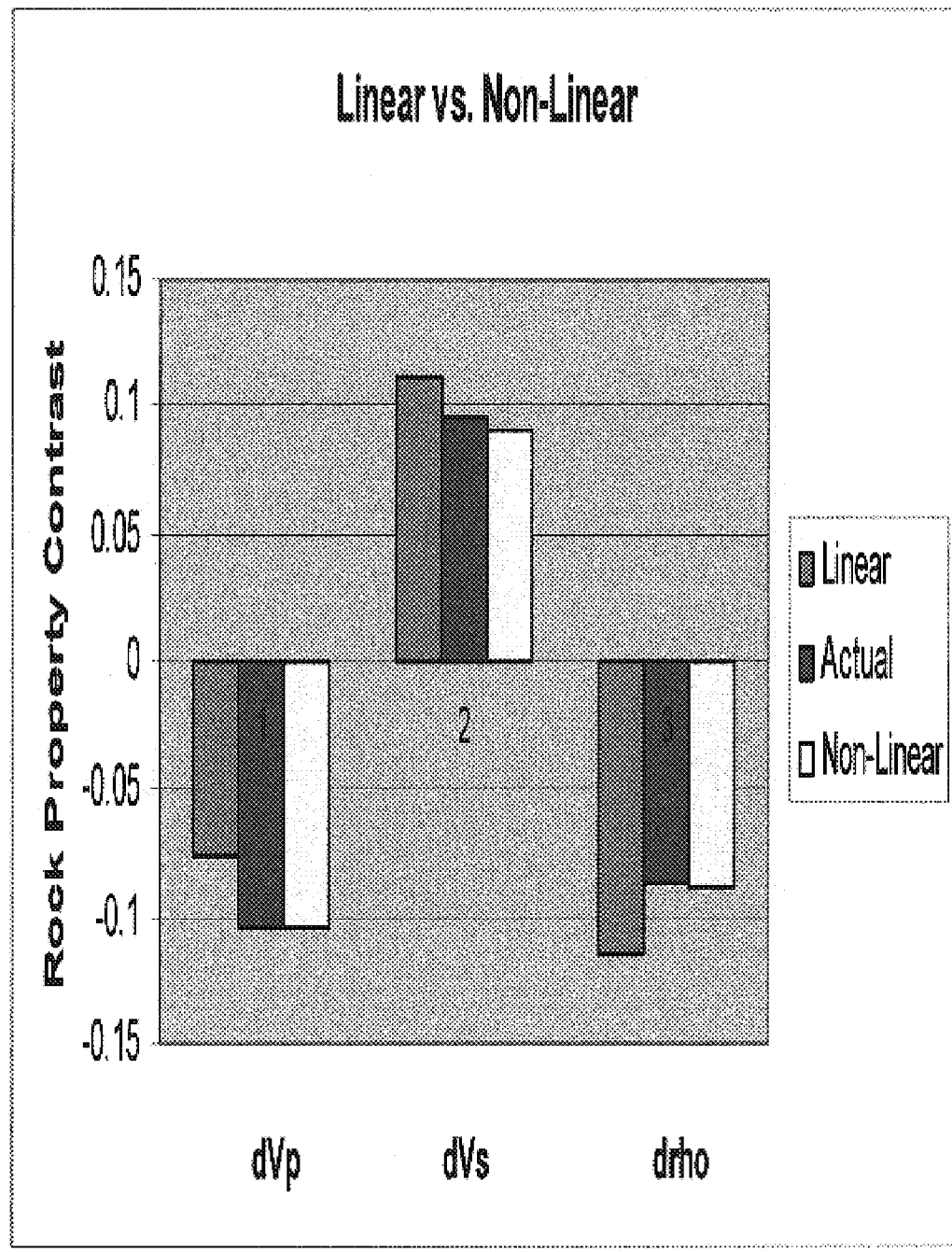
FIG. 14 shows the actual error versus linear inversion error versus non-linear inversion error.

FIG. 14 shows the actual error versus linear inversion error versus non-linear inversion error.

Figure 15:
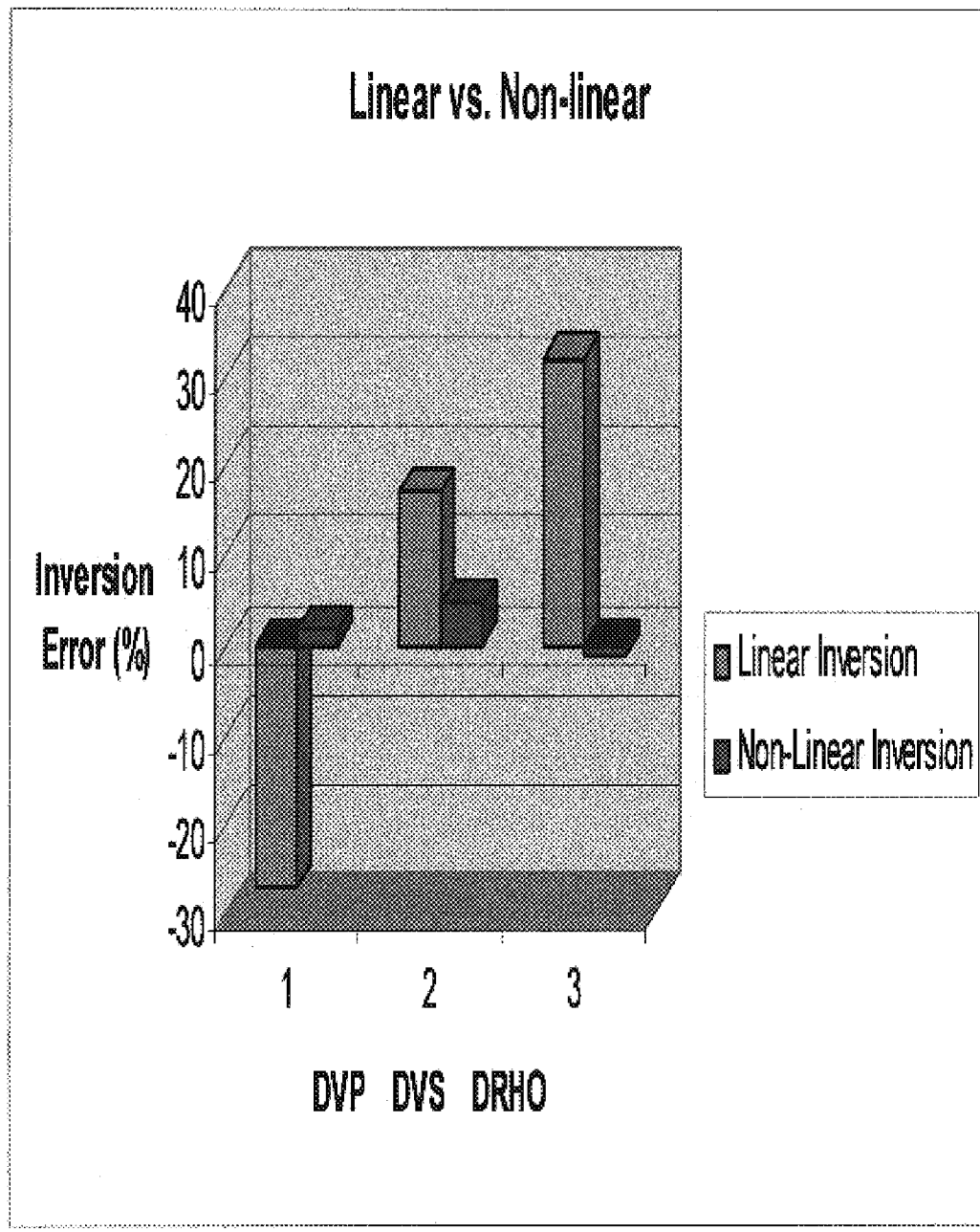
FIG. 15 shows a comparison of the linear and the non-linear inversion error.

FIG. 15 shows a comparison of the linear and the non-linear inversion error.

Figure 16:
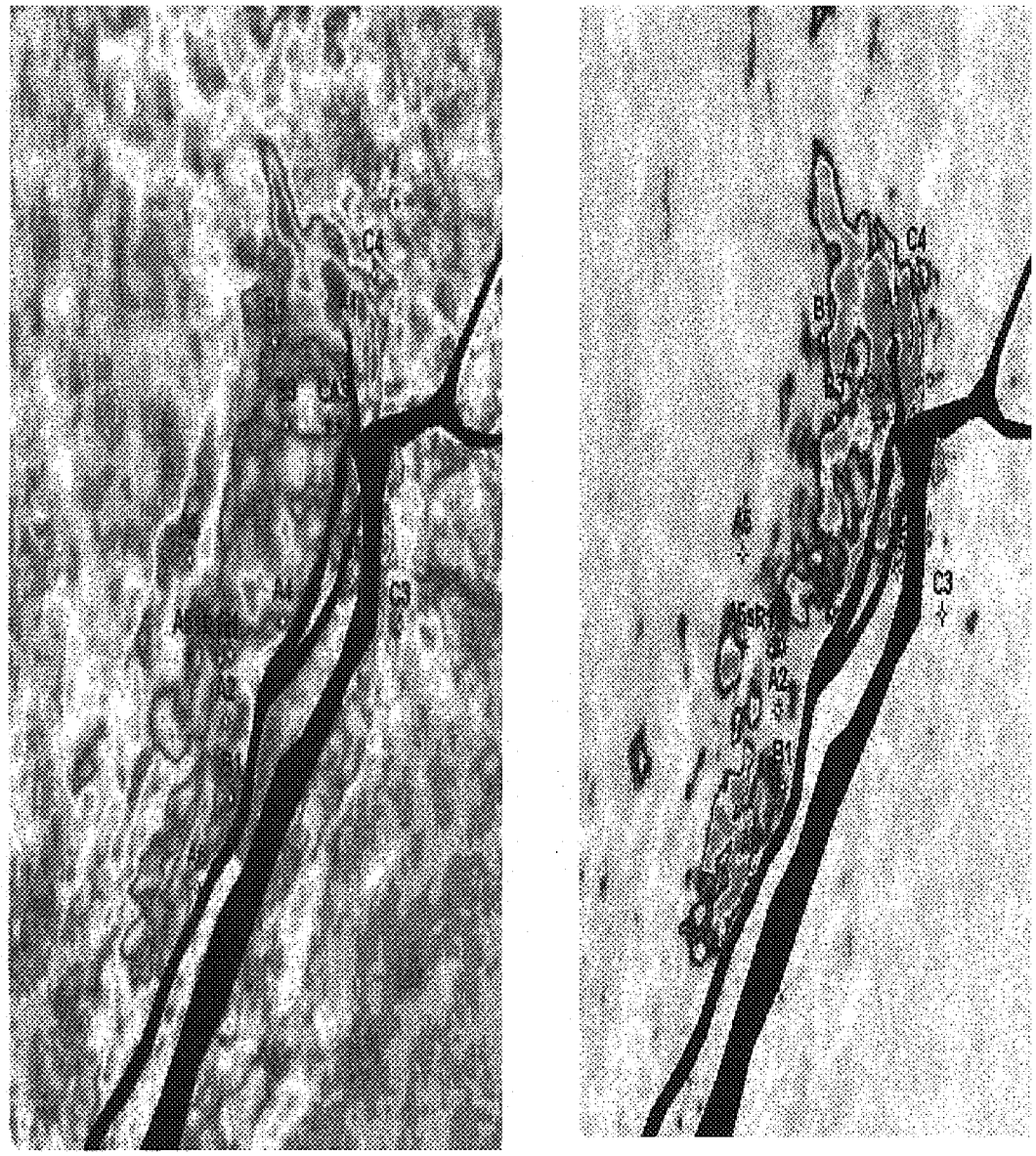
FIG. 16 is a color drawing showing a first example wherein the present method (right) out performs the prior art amplitude map (left) in highlighting only the producing wells.

FIG. 16, a color drawing showing a first example wherein the present method outperforms the prior art amplitude map in highlighting only the producing wells. The A5 well is on the upper edge of a bright zone in the prior art produced map, yet the well had residual hydrocarbons only. The A3 well was in a low amplitude zone on the prior art produced map, yet was the best producing well in the area. The B1 well, which is in a bright area on the prior art produced map, contained only thin pay and uneconomic residual pay. On the right is the product of the present method. The present method Inverted Density Contrast map highlighted the best wells and showed no anomalies around the A5 and B1 wells.

Figure 17:
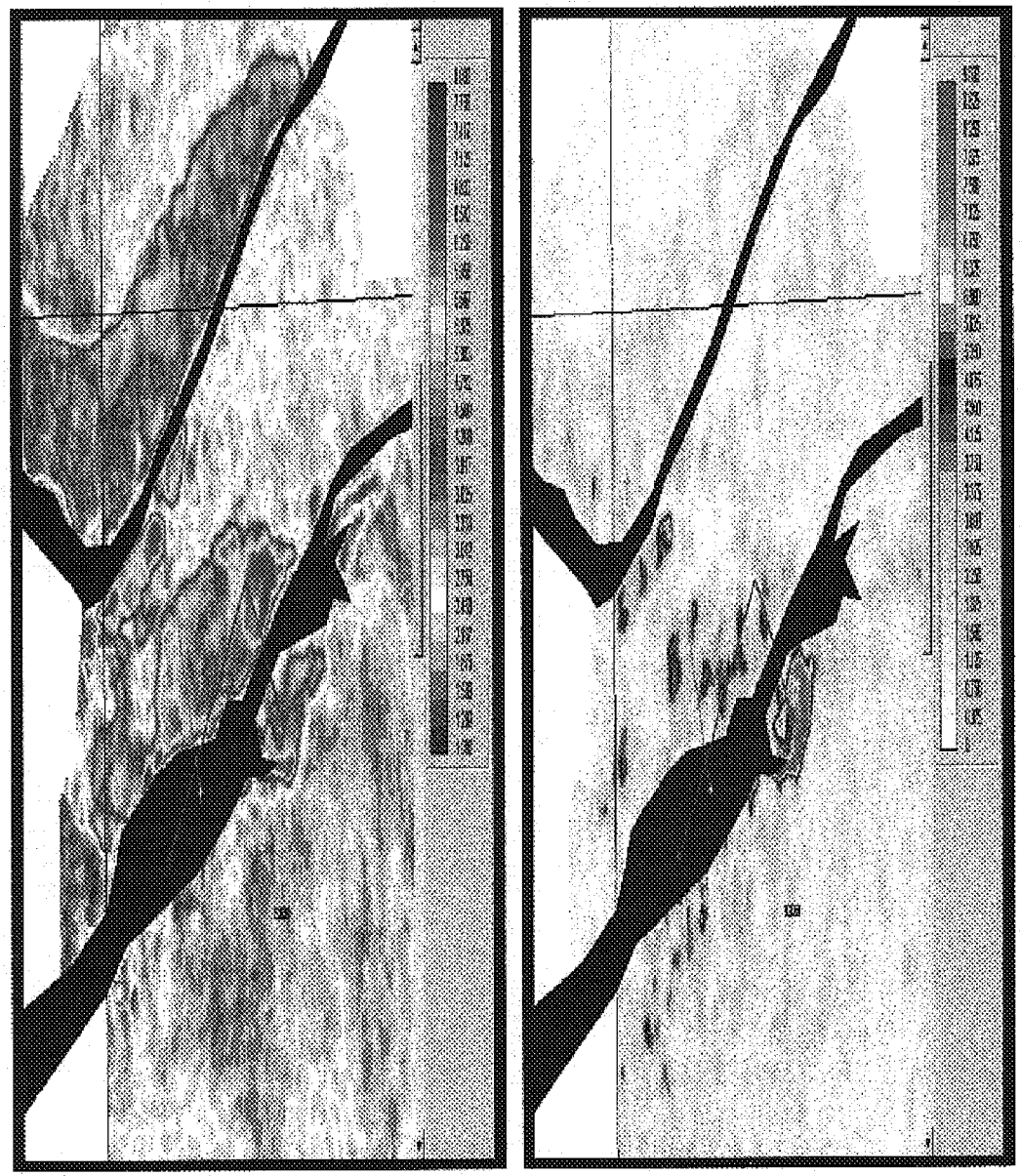
FIG. 17 is a color drawing showing a second example wherein the present method (right) out performs the prior art method (left) in discriminating between areas filled with uneconomic, partially-saturated hydrocarbons and economic, pay-filled areas.

FIG. 17, a color drawing showing a second example wherein the present method outperforms the prior art method in discriminating between areas filled with uneconomic, partially-saturated hydrocarbons and economic, pay-filled areas. On the left is a prior art produced amplitude map showing a number of bright zones. The map does not discriminate between the lower right zone, which is pay-filled, and the upper zones which are filled with partially-saturated hydrocarbons of no economic significance. On the right is the density map which highlights only the fully-saturated hydrocarbon zone.

Figure 18:
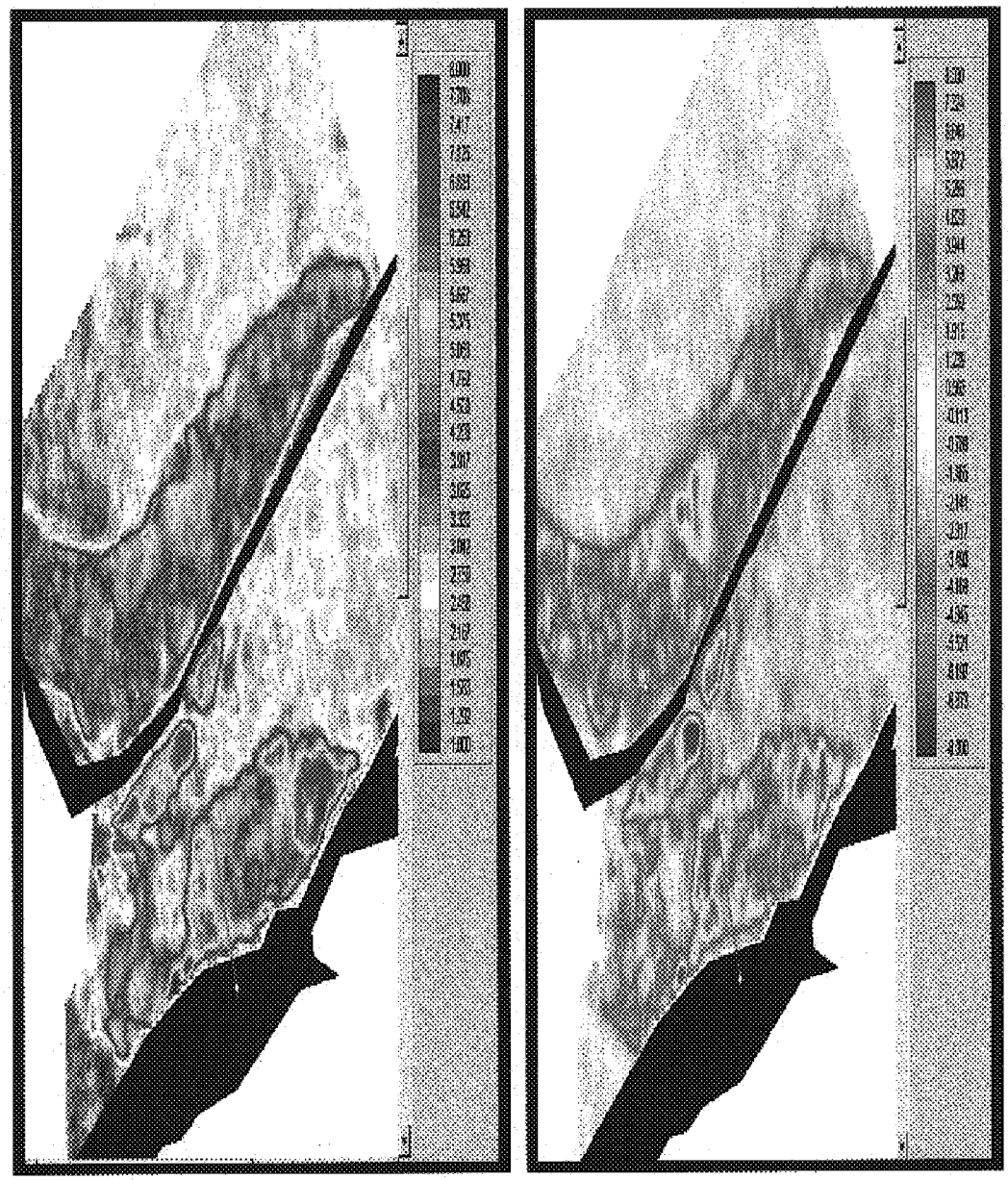
FIG. 18 is color drawing showing a third example of a prior art amplitude map on the left and a prior art AVO map on the right. Both prior art methods proved to be poor discriminators between low and high hydrocarbon saturations.

FIG. 18, a color drawing showing an amplitude map on the left highlighting two zones separated by a fault. On the right is the AVO map also highlighting the two zones. The well drilled into the area showed low-saturation pay. These two maps, produced by the prior art, proved to be poor detectors of fizz water.

Figure 19:
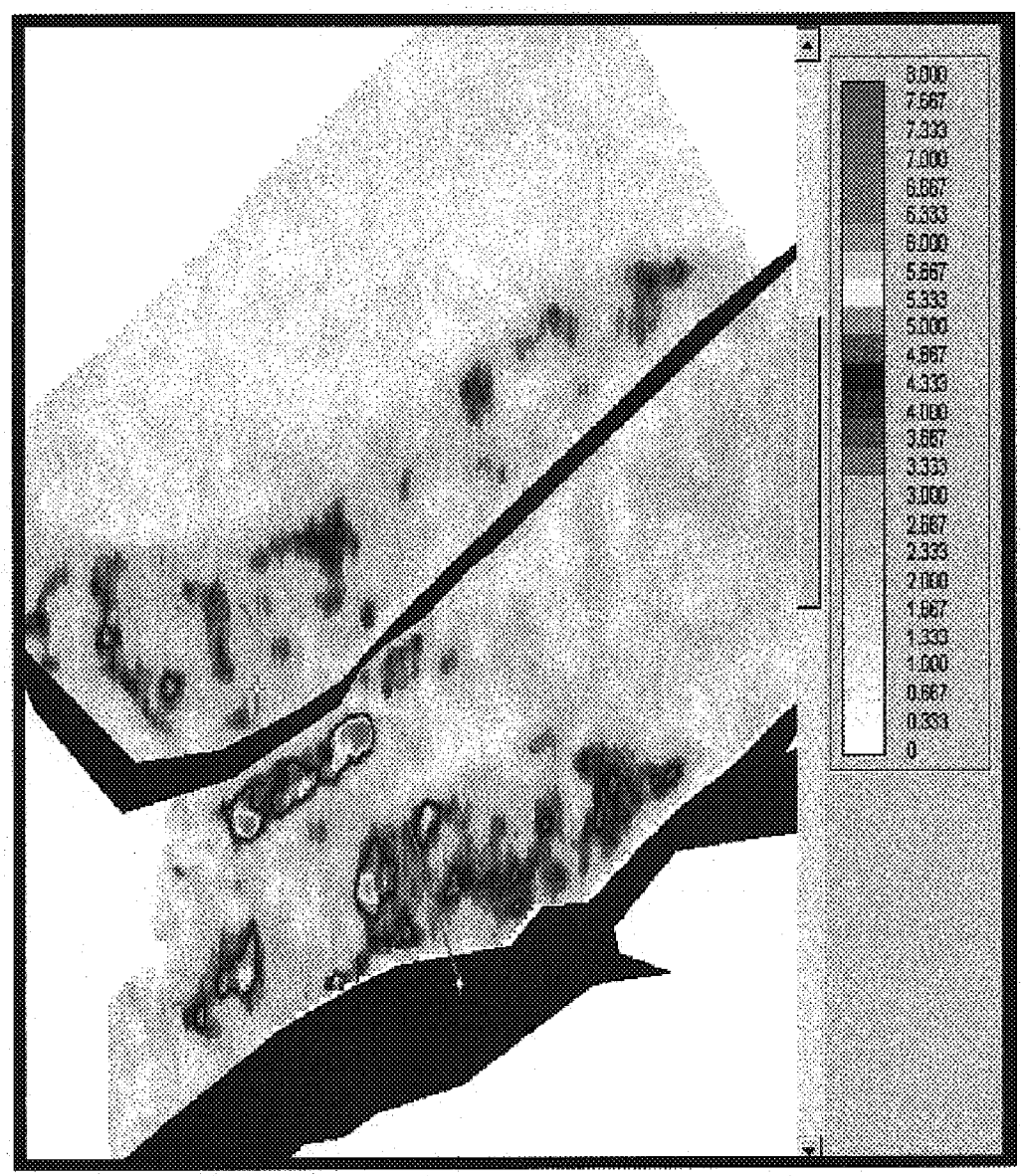
FIG. 19 is color drawing showing a present method Density Contrast map of the same area as shown in FIG. 18. The present method clearly shows the areas that are not fully pay-saturated, which the prior art methods could not do, as seen in FIG. 18.

FIG. 19, a color drawing showing a present method Density Contrast map of the same area as shown in FIG. 18. The present method clearly shows the areas that are not fully pay-saturated, which the prior art methods could not do, as seen in FIG. 18. The Density Contrast map clearly shows the two zones as not having an amonalous density contrast. The map is particulary accurate where the well is actually located. Zones not having an amonalous Density Contrast would be consistent with a zone which does not contain fully-saturated pay, which is consistent with what the well showed.

Figure 20:
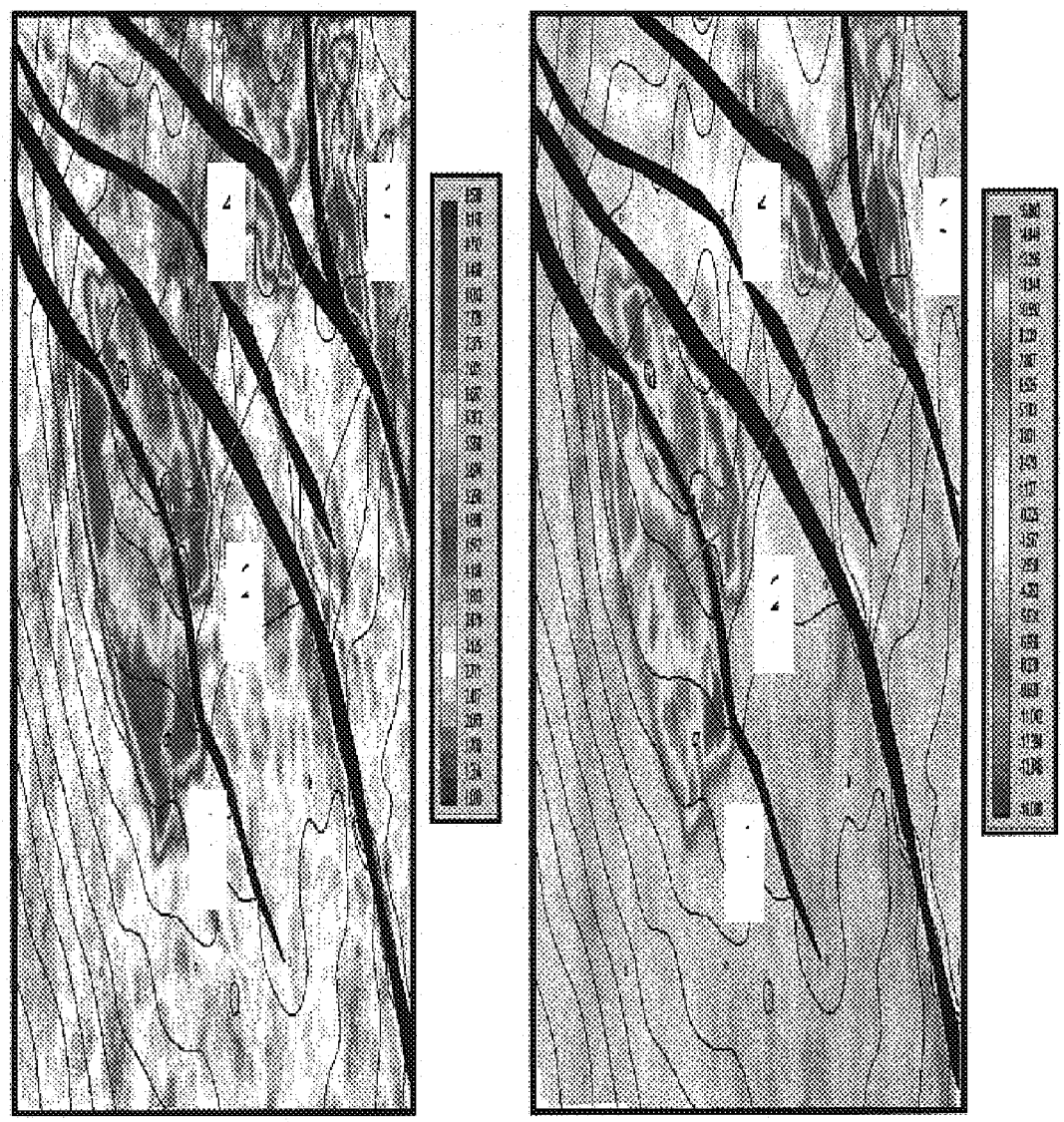
FIG. 20 is a color drawing showing a prior art amplitude map on the left and prior art AVO map on the right. The maps demonstrate the prior art methods' inability to discriminate between pay-filled and depleted zones.

FIG. 20, a color drawing showing a prior art amplitude map on the left and prior art AVO map on the right. The maps demonstrate the prior art methods inability to discriminate between pay-filled and depleted zones. The survey which produced these maps was made after the wells shown had stopped production, yet the prior art produced amplitude map and AVO map still indicate pay present for zones 1 and 2. Zones 1 and 2 had been extracted. Zone 3 was drilled but it produced little because it appears the well hit the fault rather than the reservoir. Zone 4 was never drilled. This illustrates clearly that the prior art methods are very poor at distinguishing depleted zones from zones which still contain pay.

Figure 21:
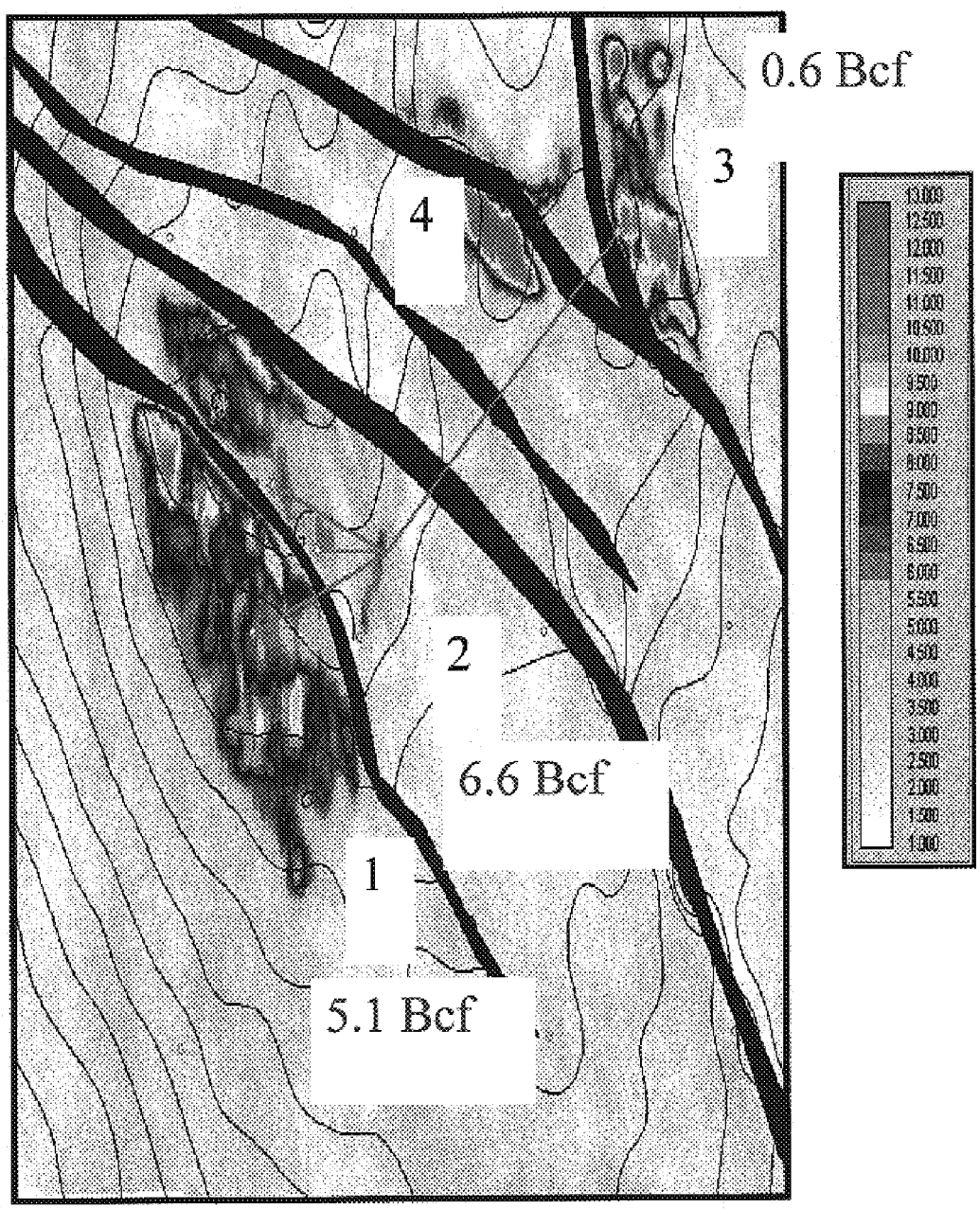
FIG. 21 a color drawing showing a present method Density Contrast map for the same reservoir as shown in FIG. 20. The depleted zones stand out as having small density contrast while the two pay-filled zones show a larger contrast.

FIG. 21, a color drawing showing a present method Density Contrast map for the same reservoir as shown in FIG. 20. The depleted zones stand out as having small density contrast while the two pay-filled zones show a larger contrast. Clearly, accurate information regarding the location of pay-filled zones would be beneficial to one skilled in the art of petroleum exploration and exploitation.

Figure 22:
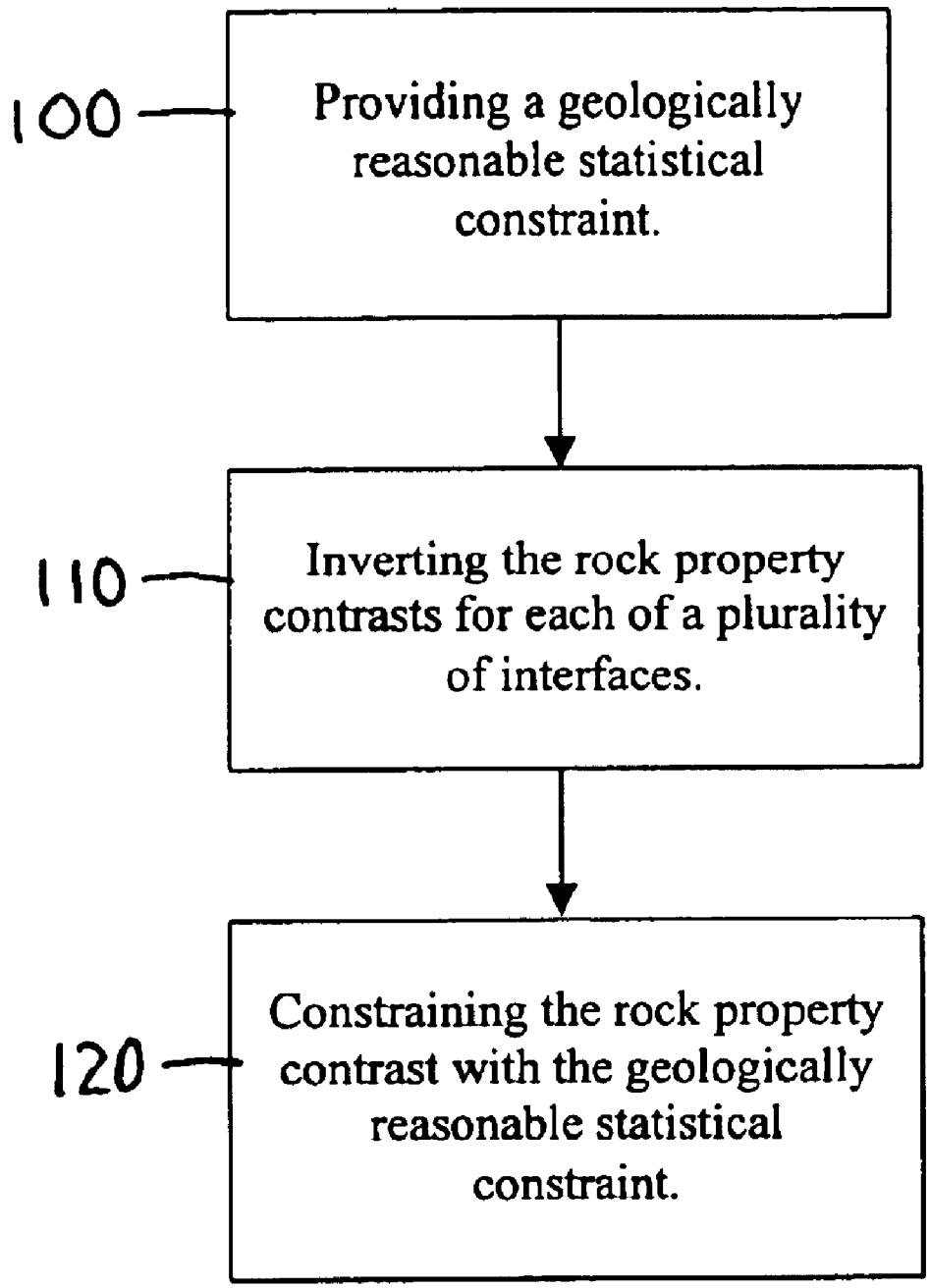
FIG. 22 is a schematic flow diagram illustrating an amplitude with offset (AVO) inversion method for a geological formation of interest.

FIG. 22 is a schematic flow diagram illustrating an amplitude with offset (AVO) inversion for a geological formation of interest. The method includes the steps of providing 100 a geologically reasonable statistical constraint for the geological formation of interest, such that such constraint relates the values of two rock properties to each other; inverting 110 the rock property contrasts for each of a plurality of interfaces in the geological formation of interest; and constraining 120 the rock property contrasts with the geologically reasonable statistical constraint.

Figure 23B:
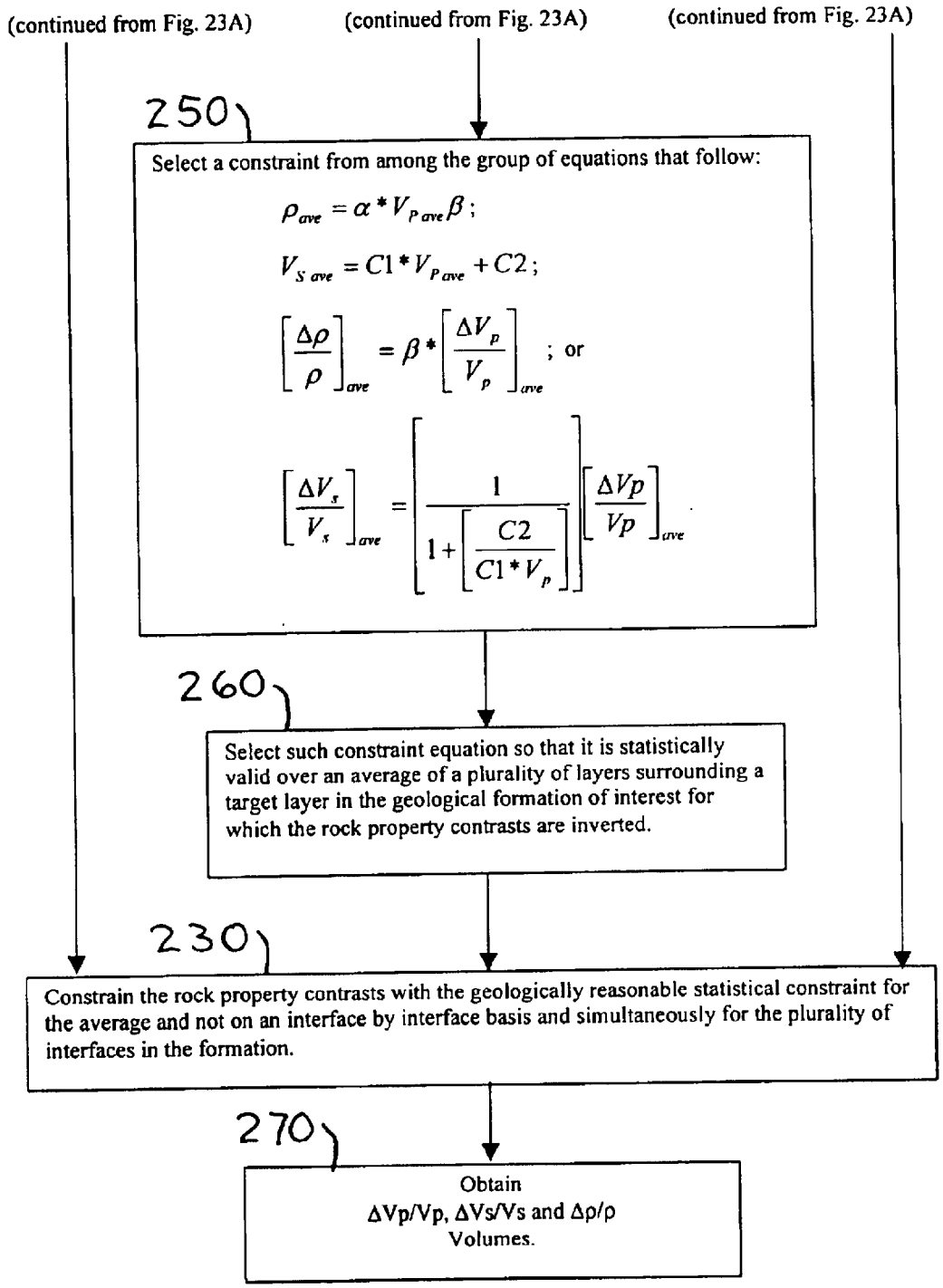
FIG. 23 (including FIG. 23A continued on FIG. 23B) is a schematic flow diagram illustrating a non-linearly statistically flow diagram illustrating a non-linearly statistically constrained inversion method.

FIG. 23 (including FIG. 23A continued on FIG. 23B) is a schematic flow diagram illustrating a non-linearly statistically constrained inversion method for a geological formation of interest. The method 200 includes providing 210 a geologically reasonable statistical constraint for the geological formation of interest, such that such constraint relates the values of two rock properties to each other, the two rock properties selected form the group consisting of density (ρ), pressure wave velocity (Vp) and shear-wave velocity (Vs); inverting 220 the rock property contrasts for each of a plurality of interfaces in the geological formation of interest; and constraining 230 the rock property contrasts with the at least one geologically reasonable statistical constraint. The step of inverting 220 the rock properties contrast in one embodiment includes using 240 a non-linear equation of the form of Equation 10 as follows:

$$Amp(\Theta) = D00 +$$

-continued $$D11 \cdot \sin(\Theta)^2 +$$

$$D12 \cdot \tan(\Theta)^2 \sin(\Theta)^2 +$$

$$D20 \cdot \tan(\Theta)^4 +$$

$$D21 \cdot f \sin(\Theta)^2 \cos(\Theta) +$$

$$D22 \cdot \frac{\sin(\Theta)^2}{f \cos(\Theta)} +$$

$$D23 \cdot \frac{\sin(\Theta)^4}{f \cos(\Theta)} +$$

$$D24 \cdot \frac{\sin(\Theta)^6}{f \cos(\Theta)}$$

where:

$$D00 = \frac{1}{2}\left[\frac{\Delta V_p}{V_p}\right] + \frac{1}{2}\left[\frac{\Delta \rho}{\rho}\right] - \frac{1}{4}\left[\frac{\Delta V_p}{V_p}\right]^2 - \frac{1}{4}\left[\frac{\Delta \rho}{\rho}\right]^2 + \ldots$$

$$D11 = \frac{1}{2}\left[\frac{\Delta V_p}{V_p}\right] - \frac{2}{g^2}\left\{2\left[\frac{\Delta V_s}{V_s}\right] + \frac{\Delta \rho}{\rho}\right\} - \frac{2}{g^2}\left\{\left[\frac{\Delta V_s}{V_s}\right]\left[\frac{\Delta \rho}{\rho}\right] - \frac{1}{2}\left[\frac{\Delta \rho}{\rho}\right]^2 + \left[\frac{\Delta V_s}{V_s}\right]^2\right\} + \frac{1}{4}\left[\frac{\Delta V_p}{V_p}\right]^2$$

$$D12 = \frac{1}{2}\left[\frac{\Delta V_p}{V_p}\right] + \frac{1}{4}\left[\frac{\Delta V_p}{V_p}\right]^2$$

$$D20 = \frac{1}{2}\left[\frac{\Delta V_p}{V_p}\right]^2$$

$$D21 = \frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}$$

$$D22 = -\frac{1}{4}\left[\frac{\Delta \rho}{\rho}\right]^2$$

$$D23 = \frac{1}{g^2}\left\{2\left[\frac{\Delta V_s}{V_s}\right]\left[\frac{\Delta \rho}{\rho}\right] + \left[\frac{\Delta \rho}{\rho}\right]^2\right\}$$

$$D24 = -\frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}, \text{ and}$$

$$f = \sqrt{(g^2 - \sin(\Theta)^2)}.$$

The step of providing 220 a geologically reasonable statistical constraint further comprises the step of selecting 260 a constraint from among the group of equations that follow:

$$\rho_{ave} = \alpha * V_{Pave} \beta;$$

$$V_{Save} = C1 * V_{Pave} + C2;$$

$$\left[\frac{\Delta \rho}{\rho}\right]_{ave} = \beta * \left[\frac{\Delta V_p}{V_p}\right]_{ave}; \text{ or}$$

$$\left[\frac{\Delta V_s}{V_s}\right]_{ave} = \left[\frac{1}{1 + \left[\frac{C2}{C1 * V_p}\right]}\right]\left[\frac{\Delta V_p}{V_p}\right]_{ave}.$$

Then the method includes the step of obtaining 270 the inverted rock property contrasts volumes.

FIG. 24 is a schematic flow diagram illustrating an alternative method 300 for a non-linearly statistically constrained inversion for a geological formation of interest. This embodiment includes selecting 310 geologically reasonable statistical constraints relationships between two of the rock property elastic parameters selected from the group consisting of density (ρ), pressure wave velocity (Vp) and shear-wave velocity (Vs); determining 320 the contrast form of the selected constraint relationships; selecting 330 a plurality of interfaces in the geological formation of interest as a constraint vertical window over which the statistical constraints will apply; extracting 340 a multiplicity of individual amplitudes corresponding to a multiplicity of traces containing reflections from a common subsurface interface for each of the plurality of interfaces within the constraint vertical window; extracting 345 reflection angles corresponding to the individual amplitudes; inverting 350 the extracted amplitudes and angles of incidence such that the inverted rock property contrasts for each interface satisfies a nonlinear equation while the rock property contrasts averaged over the constraint vertical window satisfy the selected constraint relation ships to obtain inverted rock property contrasts volumes; and writing 360 the inverted rock property contrasts volumes.

What is claimed is:

1. An AVO inversion method for a geological formation of interest, comprising the steps of:
   a) providing a geologically reasonable statistical constraint for the geological formation of interest, such that such constraint relates the values of two rock properties to each other;
   b) inverting the rock property contrasts for each of a plurality of interfaces in the geological formation of interest; and
   c) constraining the rock property contrasts with the geologically reasonable statistical constraint.

2. An AVO inversion method for a geological formation of interest as in claim 1, wherein the step of inverting the rock property contrast comprises using a non-linear equation to perform the inversion.

3. An AVO inversion method for a geological formation of interest as in claim 1, wherein the step of constraining the rock property contrast with the geologically reasonable statistical constraint comprises constraining the rock property contrasts for the average and not on an interface by interface basis.

4. An AVO inversion method for a geological formation of interest as in claim 3, wherein the step of constraining the rock property contrast with the geologically reasonable statistical constraint, further comprises simultaneously constraining the inverted rock property contrasts for the plurality of interfaces in the formation.

5. An AVO inversion method for a geological formation of interest as in claim 1 wherein the step of providing a statistical constraint further comprises the step of selecting a constraint from among the group of equations that follow:

$$\rho_{ave} = \alpha * V_{Pave} \beta;$$

$$V_{Save} = C1 * V_{Pave} + C2;$$

$$\left[\frac{\Delta \rho}{\rho}\right]_{ave} = \beta * \left[\frac{\Delta V_p}{V_p}\right]_{ave}; \text{ or}$$

$$\left[\frac{\Delta V_s}{V_s}\right]_{ave} = \left[\frac{1}{1 + \left[\frac{C2}{C1 * V_p}\right]}\right]\left[\frac{\Delta V_p}{V_p}\right]_{ave}.$$

6. An AVO inversion method for a geological formation of interest as in claim 5 wherein the step of selecting a constraint from among a group of equations further comprises selecting such constraint equation so that it is statistically valid over an average of a plurality of layers surrounding a target layer in the geological formation of interest for which the rock property contrasts are inverted.

7. An AVO inversion method for a geological formation of interest as in claim 5 wherein the step of constraining the inversion of the rock property contrast with the geologically reasonable statistical constraint comprises constraining the rock property contrasts for the average and not on an interface by interface basis.

8. An AVO inversion method for a geological formation of interest as in claim 7 wherein the step of constraining the inversion of the rock property contrast with the geologically reasonable statistical constraint, further comprises simultaneously constraining the inverted rock property contrasts for the plurality of interfaces in the geological formation.

9. An AVO inversion method for a geological formation of interest comprising:
   a) providing a geologically reasonable statistical constraint for the geological formation of interest, such that such constraint relates the values of two rock properties to each other;
   b) inverting the rock property contrasts for each of a plurality of interfaces in the geological formation of interest; and
   c) constraining the rock property contrasts with the geologically reasonable statistical constraint, and
   d) wherein the step of inverting the rock properties contrast comprises using a non-linear equation of the form of Equation 10 as follows:

$$Amp(\Theta) = D00 +$$
$$D11 \cdot \sin(\Theta)^2 +$$
$$D12 \cdot \tan(\Theta)^2 \sin(\Theta)^2 +$$
$$D20 \cdot \tan(\Theta)^4 +$$
$$D21 \cdot f \sin(\Theta)^2 \cos(\Theta) +$$
$$D22 \cdot \frac{\sin(\Theta)^2}{f \cos(\Theta)} +$$
$$D23 \cdot \frac{\sin(\Theta)^4}{f \cos(\Theta)} +$$
$$D24 \cdot \frac{\sin(\Theta)^6}{f \cos(\Theta)}$$

where:

$$D00 = \frac{1}{2}\left[\frac{\Delta V_p}{V_p}\right] + \frac{1}{2}\left[\frac{\Delta \rho}{\rho}\right] - \frac{1}{4}\left[\frac{\Delta V_p}{V_p}\right]^2 - \frac{1}{4}\left[\frac{\Delta \rho}{\rho}\right]^2 + \ldots$$

$$D11 = \frac{1}{2}\left[\frac{\Delta V_p}{V_p}\right] - \frac{2}{g^2}\left\{2\left[\frac{\Delta V_s}{V_s}\right] + \frac{\Delta \rho}{\rho}\right\} - \frac{2}{g^2}\left\{\left[\frac{\Delta V_s}{V_s}\right]\left[\frac{\Delta \rho}{\rho}\right] - \frac{1}{2}\left[\frac{\Delta \rho}{\rho}\right]^2 + \left[\frac{\Delta V_s}{V_s}\right]^2\right\} + \frac{1}{4}\left[\frac{\Delta V_p}{V_p}\right]^2$$

$$D12 = \frac{1}{2}\left[\frac{\Delta V_p}{V_p}\right] + \frac{1}{4}\left[\frac{\Delta V_p}{V_p}\right]^2$$

$$D20 = \frac{1}{2}\left[\frac{\Delta V_p}{V_p}\right]^2$$

$$D21 = \frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}$$

$$D22 = -\frac{1}{4}\left[\frac{\Delta \rho}{\rho}\right]^2$$

$$D23 = \frac{1}{g^2}\left\{2\left[\frac{\Delta V_s}{V_s}\right]\left[\frac{\Delta \rho}{\rho}\right] + \left[\frac{\Delta \rho}{\rho}\right]^2\right\}$$

-continued $$D24 = -\frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}, \text{ and}$$

$$f = \sqrt{(g^2 - \sin(\Theta)^2)}.$$

10. An AVO inversion method for a geological formation of interest, comprising:
 a) providing at least one geologically reasonable statistical constraint for the geological formation of interest, such that such constraint relates the values of two rock properties to each other, the two rock properties selected form the group consisting of density (ρ), pressure wave velocity (Vp) and shear-wave velocity (Vs);
 b) inverting the rock property contrasts for each of a plurality of interfaces in the geological formation of interest; and
 c) constraining the rock property contrasts with the at least one geologically reasonable statistical constraint.

11. An AVO inversion method for a geological formation of interest as in claim 10, wherein the step of inverting the rock property contrast comprises using a non-linear equation to perform the inversion.

12. An AVO inversion method for a geological formation of interest as in claim 10, wherein the step of constraining the rock property contrast with the at least one geologically reasonable statistical constraint comprises constraining the rock property contrasts for the average and not on an interface by interface basis.

13. An AVO inversion method for a geological formation of interest as in claim 12, wherein the step of constraining the rock property contrast with the at least one geologically reasonable statistical constraint, further comprises simultaneously constraining the inverted rock property contrasts for the plurality of interfaces in the formation.

14. An AVO inversion method for a geological formation of interest as in claim 10 wherein the step of inverting the rock properties contrast comprises using a non-linear equation of the form of Equation 10 as follows:

$$Amp(\Theta) = D00 +$$
$$D11 \cdot \sin(\Theta)^2 +$$
$$D12 \cdot \tan(\Theta)^2 \sin(\Theta)^2 +$$
$$D20 \cdot \tan(\Theta)^4 +$$
$$D21 \cdot f \sin(\Theta)^2 \cos(\Theta) +$$
$$D22 \cdot \frac{\sin(\Theta)^2}{f \cos(\Theta)} +$$
$$D23 \cdot \frac{\sin(\Theta)^4}{f \cos(\Theta)} +$$
$$D24 \cdot \frac{\sin(\Theta)^6}{f \cos(\Theta)}$$

where:

$$D00 = \frac{1}{2}\left[\frac{\Delta V_p}{V_p}\right] + \frac{1}{2}\left[\frac{\Delta \rho}{\rho}\right] - \frac{1}{4}\left[\frac{\Delta V_p}{V_p}\right]^2 - \frac{1}{4}\left[\frac{\Delta \rho}{\rho}\right]^2 + \dots$$

$$D11 = \frac{1}{2}\left[\frac{\Delta V_p}{V_p}\right] - \frac{2}{g^2}\left\{2\left[\frac{\Delta V_s}{V_s}\right] + \frac{\Delta \rho}{\rho}\right\} - \frac{2}{g^2}\left\{\left[\frac{\Delta V_s}{V_s}\right]\left[\frac{\Delta \rho}{\rho}\right] - \frac{1}{2}\left[\frac{\Delta \rho}{\rho}\right]^2 + \left[\frac{\Delta V_s}{V_s}\right]^2\right\} + \frac{1}{4}\left[\frac{\Delta V_p}{V_p}\right]^2$$

$$D12 = \frac{1}{2}\left[\frac{\Delta V_p}{V_p}\right] + \frac{1}{4}\left[\frac{\Delta V_p}{V_p}\right]^2$$

$$D20 = \frac{1}{2}\left[\frac{\Delta V_p}{V_p}\right]^2$$

$$D21 = \frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}$$

$$D22 = -\frac{1}{4}\left[\frac{\Delta \rho}{\rho}\right]^2$$

$$D23 = \frac{1}{g^2}\left\{2\left[\frac{\Delta V_s}{V_s}\right]\left[\frac{\Delta \rho}{\rho}\right] + \left[\frac{\Delta \rho}{\rho}\right]^2\right\}$$

$$D24 = -\frac{1}{g^4}\left\{4\left[\frac{\Delta V_s}{V_s}\right]^2 + 4\left[\frac{\Delta V_s}{V_s}\right]\left[\frac{\Delta \rho}{\rho}\right] + \left[\frac{\Delta \rho}{\rho}\right]^2\right\}, \text{ and}$$

$$f = \sqrt{(g^2 - \sin(\Theta)^2)}.$$

15. An AVO inversion method for a geological formation of interest as in claim 10 wherein the step of providing at least one statistical constraint further comprises the step of selecting at least one constraint from among the group of equations that follow:

$$\rho_{ave} = \alpha * V_{Pave}\beta;$$

$$V_{Save} = C1 * V_{Pave} + C2;$$

$$\left[\frac{\Delta \rho}{\rho}\right]_{ave} = \beta * \left[\frac{\Delta V_p}{V_p}\right]_{ave}; \text{ or}$$

$$\left[\frac{\Delta V_s}{V_s}\right]_{ave} = \left[\frac{1}{1 + \left[\frac{C2}{C1 * V_p}\right]}\right]\left[\frac{\Delta V_p}{V_p}\right]_{ave}.$$

16. An AVO inversion method for a geological formation of interest as in claim 15 wherein the step of selecting at least one constraint from among a group of equations further comprises selecting such constraint equation so that it is statistically valid over an average of a plurality of layers surrounding vertically a target layer in the geological formation of interest for which the rock property contrasts are inverted.

17. An AVO inversion method for a geological formation of interest as in claim 15 wherein the step of constraining the inversion of the rock property contrast with the geologically reasonable statistical constraint comprises constraining the rock property contrasts for the average and not on an interface by interface basis.

18. An AVO inversion method for a geological formation of interest as in claim 17 wherein the step of constraining the inversion of the rock property contrast with the at least one geologically reasonable statistical constraint, further comprises simultaneously constraining the inverted rock property contrasts for the plurality of interfaces in the geological formation.

19. An AVO inversion method for a geological formation of interest as in claim 10 wherein the step of providing at least one statistical constraint further comprises providing a plurality of geologically reasonable statistical constraints and the step of constraining the rock property contrasts with the at least one geologically reasonable statistical constraint comprises constraining the rock property contrasts with the plurality geologically reasonable statistical constraints.

20. An AVO inversion method for a geological formation of interest, comprising the steps of:
   a) providing a geologically reasonable statistical constraint for the geological formation of interest, such that such constraint relates the values of two rock properties to each other, the two rock properties selected form the group consisting of density (ρ), pressure wave velocity (Vp) and shear-wave velocity (Vs);
   b) inverting the rock property contrasts, for each of a plurality of interfaces in the geological formation of interest, using a non-linear equation to perform the inversion; and
   c) constraining the rock property contrasts, with the geologically reasonable statistical constraint, for the average and not on an interface by interface basis.

21. An AVO inversion method for a geological formation of interest, comprising:
   a) selecting geologically reasonable statistical constraints relationships between two of the rock property elastic parameters selected from the group consisting of density (ρ), pressure wave velocity (Vp) and shear-wave velocity (Vs);
   b) determining the contrast form of the selected constraint relationships;
   c) selecting a plurality of interfaces in the geological formation of interest as a constraint vertical window over which the statistical constraints will apply;
   d) extracting a multiplicity of individual amplitudes corresponding to a multiplicity of traces containing reflections from a common subsurface interface for each of the plurality of interfaces within the constraint vertical window;
   e) extracting reflection angles corresponding to the individual amplitudes;
   f) inverting the extracted amplitudes and angles of incidence such that the inverted rock property contrasts for each interface satisfies a nonlinear equation while the rock property contrasts averaged over the constraint vertical window satisfy the selected constraint relation ships to obtain inverted rock property contrasts volumes; and
   g) writing the inverted rock property contrasts volumes.

* * * * *